(12) United States Patent
Kawana

(10) Patent No.: US 8,438,625 B2
(45) Date of Patent: May 7, 2013

(54) MANAGEMENT APPARATUS, CONTROL METHOD, AND STORAGE MEDIUM

(75) Inventor: Yoshimasa Kawana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 11/748,291

(22) Filed: May 14, 2007

(65) Prior Publication Data

US 2007/0294228 A1    Dec. 20, 2007

(30) Foreign Application Priority Data

Jun. 14, 2006  (JP) ................................. 2006-165374

(51) Int. Cl.
*H04L 29/06*    (2006.01)

(52) U.S. Cl.
USPC .............. 726/11; 709/203; 709/208; 709/223

(58) Field of Classification Search ...................... 726/11
See application file for complete search history.

(56) References Cited

U.S. PATENT DOCUMENTS

| | | | |
|---|---|---|---|
| 6,678,827 B1 * | 1/2004 | Rothermel et al. ............... | 726/6 |
| 7,028,025 B2 * | 4/2006 | Collins ................................. | 1/1 |
| 7,243,132 B2 * | 7/2007 | Choi ............................. | 709/208 |
| 2001/0056486 A1 * | 12/2001 | Kosaka ......................... | 709/224 |
| 2003/0172308 A1 * | 9/2003 | Imai .............................. | 713/201 |
| 2003/0204756 A1 * | 10/2003 | Ransom et al. ............... | 713/300 |
| 2004/0015740 A1 * | 1/2004 | Dautelle ........................ | 714/37 |

FOREIGN PATENT DOCUMENTS

| | | | |
|---|---|---|---|
| JP | 2001-273211 A | 10/2001 | |
| JP | 2002-082792 A | 3/2002 | |
| JP | 2005-308300 A | 11/2005 | |
| JP | 2006-033718 A | 2/2006 | |

* cited by examiner

*Primary Examiner* — Kambiz Zand
*Assistant Examiner* — Imhotep Durham
(74) *Attorney, Agent, or Firm* — Carterm DeLuca, Farrell & Schmidt LLP

(57) ABSTRACT

A management apparatus connectable, through a network, to a managed device located in a network environment utilizing a firewall to disallow spontaneous access through the network from an outside, the management apparatus includes an input unit configured to enter an instruction addressed to the managed device, and an instruction reply unit configured to receive a query from the managed device through the firewall as to the presence/absence of the instruction and, when the instruction entered through the input unit is present, reply with the entered instruction in response to the query in the course of a session established when the query is received, wherein the instruction reply unit, along with replying with one instruction entered in response to the query, maintains the session and, executes another entered instruction according to the response of the managed device to the reply.

15 Claims, 28 Drawing Sheets

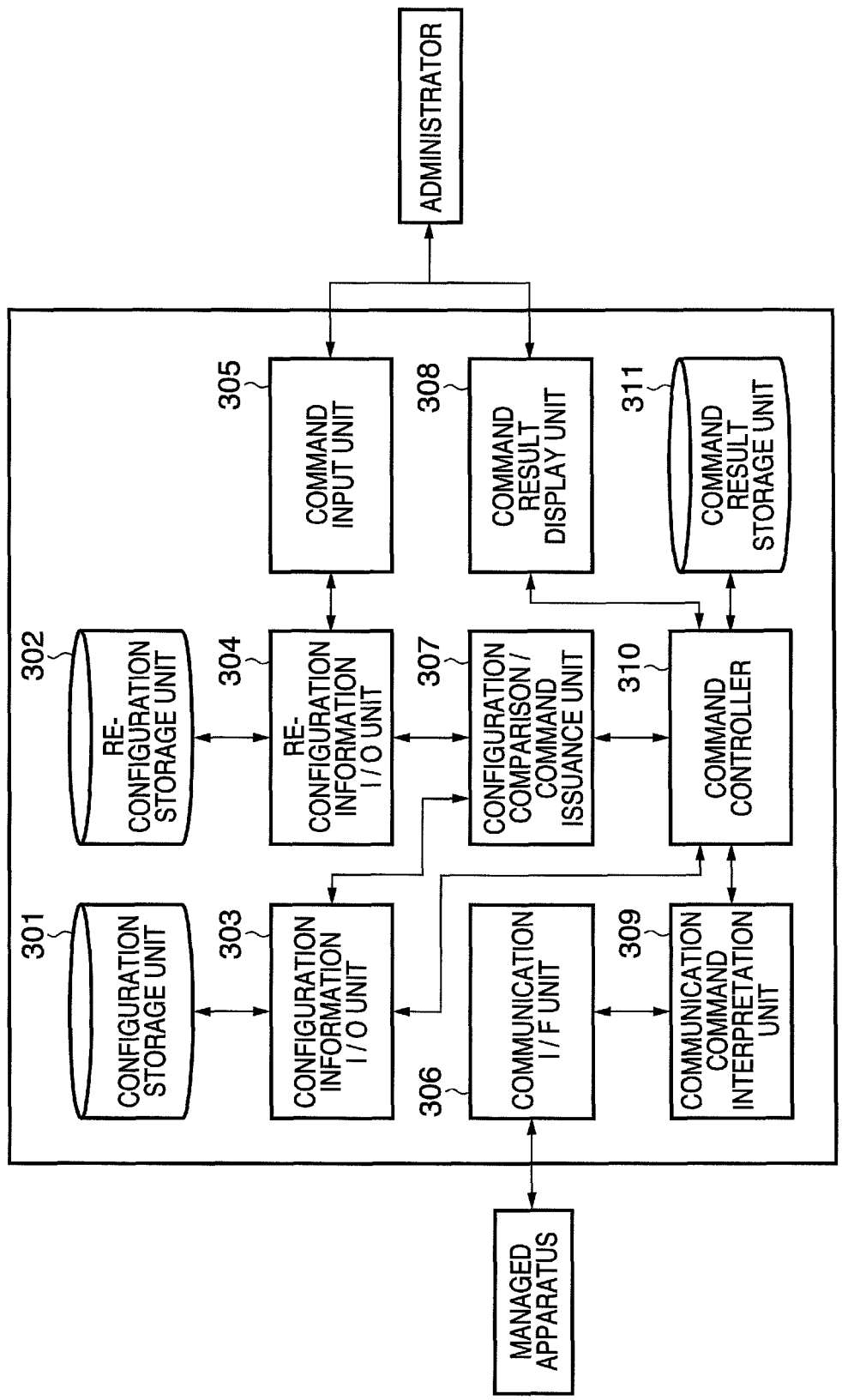

FIG. 4A 203, 208

| | |
|---|---|
| SYSTEM PROGRAM (OS) | 401 |
| DEVICE MANAGEMENT PROGRAM | 402 |
| USER INTERFACE PROGRAM (USER-ENTERED COMMAND ANALYSIS) | 403 |
| ADMINISTRATOR / MANAGED APPARATUS AUTHENTICATION PROGRAM | 404 |
| MESSAGE TRANSMIT / RECEIVE PROGRAM | 405 |
| RECEIVED COMMAND ANALYSIS PROGRAM | 406 |
| PROCESSING PROGRAMS | 407 |
|   REQUEST TRANSMISSION PROCESSING | 407a |
|   CONFIGURATION INFORMATION RECEPTION PROCESSING | 407b |
|   STATUS RECEPTION PROCESSING | 407c |
|   ⋮ | |
| COMMAND TABLE | 408 |
|   INPUT COMMANDS | 408a |
|   TRANSMITTED COMMANDS | 408b |
|   RECEIVED COMMANDS | 408c |
| MANAGED APPARATUS CONFIGURATION INFORMATION DB | 409 |
| MANAGED APPARATUS DB | 410 |
|   DEVICE 1 ID | 411 |
|     USER ID PERMITTING ACCESS, ... | 411a |
|     NUMBER OF STORED COMMANDS (N1) | 411b |
|     COMMAND 11 | 411c |
|     ⋮ | |
|   DEVICE 2 ID | 412 |
|     USER ID PERMITTING ACCESS, ... | 412a |
|     NUMBER OF STORED COMMANDS (N2) | 412b |
|     COMMAND 21 | 412c |
|     ⋮ | |

FIG. 5

MANAGEMENT SERVER COMMUNICATION SAMPLE 1

| RESPONSE TO COMMAND REQUEST | ~801 |
|---|---|
| COMMUNICATION RESULTS | ~802 |
| DATE AND TIME OF COMPLETION OF PROCESSING | ~803 |
| DETAILED EXPLANATIONS IF THERE WERE COMMUNICATION ERRORS | ~804 |
| COMMAND INFORMATION (ADDITION OF MONITORED DEVICE) | ~805 |
| INFORMATION REGARDING DEVICE E | ~806 |

MANAGEMENT SERVER COMMUNICATION SAMPLE 2

| COMMAND INFORMATION (RESPONSE TO COMMAND RESULTS) | ~807 |
|---|---|
| COMMUNICATION RESULTS | ~802 |
| TIME AND DATE OF COMPLETION OF PROCESSING | ~803 |
| DETAILED EXPLANATIONS IF THERE WERE COMMUNICATION ERRORS | ~804 |
| COMMAND REQUEST INVOCATION COMMAND | ~808 |

FIG. 6

INPUT COMMANDS

| Number | Command | Value | |
|---|---|---|---|
| 1 | Change Location | Device A, Kawasaki-Building 4F | ~1101 |
| 2 | Add Device | Device D, Device-6550, 192.168.0.11, Kawasaki-Building 5F, Toru Saito | ~1102 |
| 3 | Change Location | Device A, Kawasaki-Building 2F | ~1103 |
| 4 | Add Device | Device E, Device-3200, 172.16.0.25, Tokyo-Building Room C, Hiroshi Kato | ~1104 |
| 5 | Delete Device | Device D | ~1105 |

FIG. 7
EXAMPLES OF COMMANDS

| Command | CONTENTS | |
|---|---|---|
| addDevice | REQUISITION REGARDING ADDITION OF MONITORED DEVICE | ~1001 |
| modifyDevice | REQUISITION REGARDING ATTRIBUTE CHANGE FOR MONITORED DEVICE | ~1002 |
| deleteDevice | REQUISITION REGARDING DELETION OF MONITORED DEVICE | ~1003 |
| schedule | REQUISITION REGARDING COMMUNICATION SCHEDULE CHANGES | ~1004 |
| checkConfiguration | CONFIGURATION INFORMATION INVOCATION REQUISITION | ~1005 |
| sendConfiguration | CONFIGURATION INFORMATION TRANSMISSION REQUISITION | ~1006 |
| download | REQUISITION REGARDING MODULE REPLACEMENT IN MANAGED APPARATUS | ~1007 |
| reboot | REQUISITION TO REBOOT MANAGED APPARATUS | ~1008 |
| getConfiguration | REQUISITION CONCERNING INVOCATION OF SETTINGS-REFLECTING COMMANDS | ~1009 |
| getAlarmLevelConversionList | REQUISITION REGARDING INVOCATION OF STATUS FILTER | ~1010 |
| getAlertCodeNotificationList | REQUISITION REGARDING INVOCATION OF ALARM FILTER | ~1011 |

FIG. 8

CONFIGURATION INFORMATION HELD IN DATABASE

| CONFIGURATION INFORMATION OF MANAGED APPARATUSES | | ~1201 |
|---|---|---|
| Device A | | ~1202 |
| Product Name | Device-3250 | ~1203 |
| IP Address | 192.168.0.1 | ~1204 |
| Device Location | Kawasaki-Building 3F | ~1205 |
| Device Administrator | Taro Yamada | ~1206 |
| Device B | | ~1207 |
| Product Name | Device-2525 | ~1208 |
| IP Address | 10.0.0.2 | ~1209 |
| Device Location | Tokyo-Building Room A | ~1210 |
| Device Administrator | Ichiro Suzuki | ~1211 |
| Device C | | ~1212 |
| Product Name | Device-3250 | ~1213 |
| IP Address | 172.16.0.5 | ~1214 |
| Device Location | Tokyo-Building Room B | ~1215 |
| Device Administrator | Hanako Sato | ~1216 |

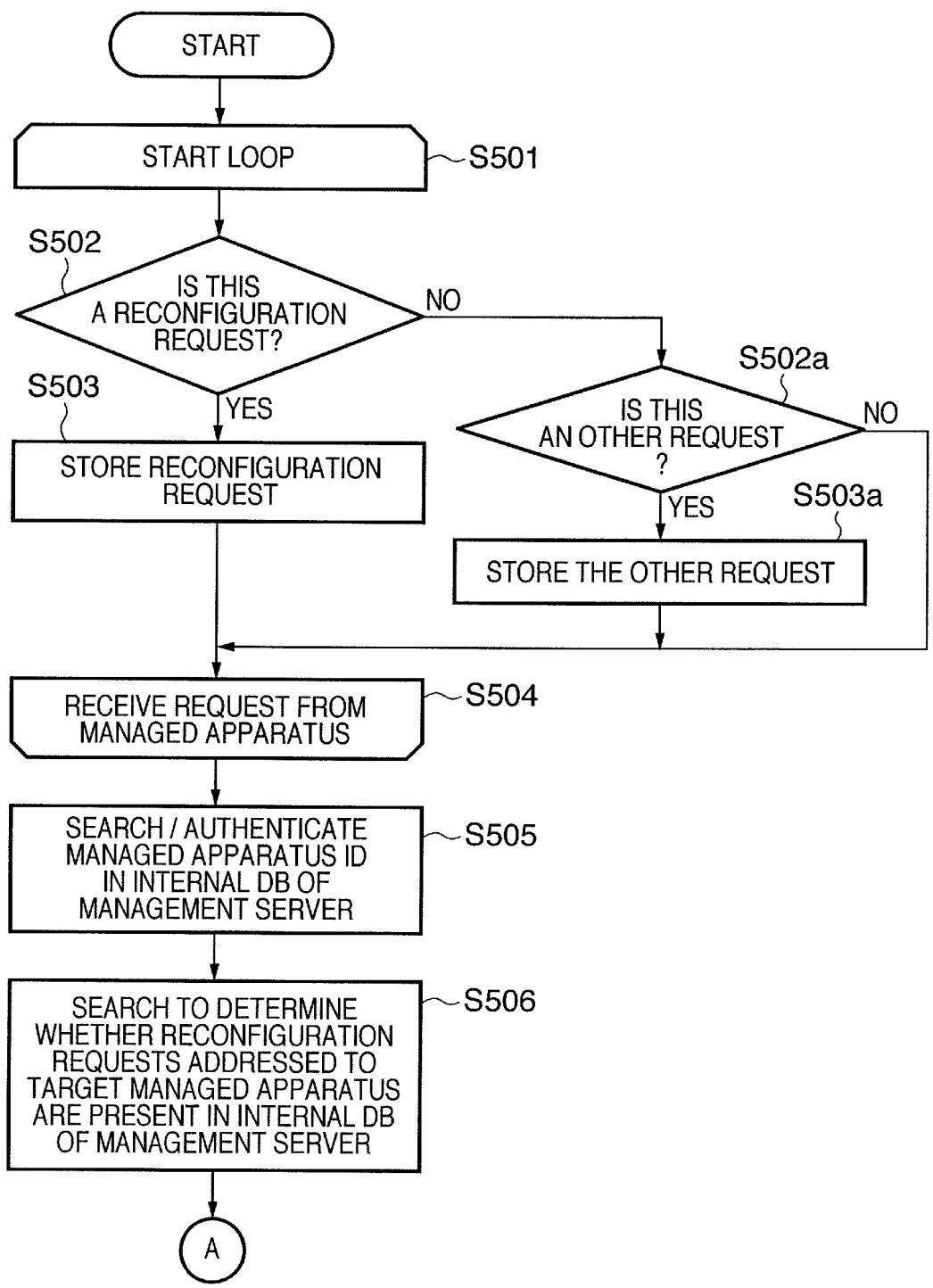

FIG. 10

COMMAND-BASED CONFIGURATION INFORMATION

| MANAGED APPARATUS RECONFIGURATION INFORMATION | | | |
|---|---|---|---|
| Device A | | | |
| Product Name | Device-3250 | | |
| IP Address | 192.168.0.1 | | |
| Device Location | Kawasaki-Building 2F | ☒ | |
| Device Administrator | Taro Yamada | | |
| Device B | | | |
| Product Name | Device-2525 | | |
| IP Address | 10.0.0.2 | | |
| Device Location | Tokyo-Building Room A | | |
| Device Administrator | Ichiro Suzuki | | |
| Device C | | | |
| Product Name | Device-3200 | | |
| IP Address | 172.16.0.5 | | |
| Device Location | Tokyo-Building Room B | | |
| Device Administrator | Hanako Sato | | |
| Device D | | | |
|  |  |  | |
|  |  |  | |
|  |  |  | |
|  |  |  | |
| Device E | | | |
| Product Name | Device-3200 | ☒ | |
| IP Address | 172.16.0.25 | ☒ | |
| Device Location | Tokyo-Building Room C | ☒ | |
| Device Administrator | Hiroshi Kato | ☒ | |

~1217
~1218
~1219
~1220
~1221
~1222
~1223
~1224
~1225
~1226
~1227
~1228
~1229
~1230
~1231
~1232
~1233
~1238
~1239
~1240
~1241
~1242

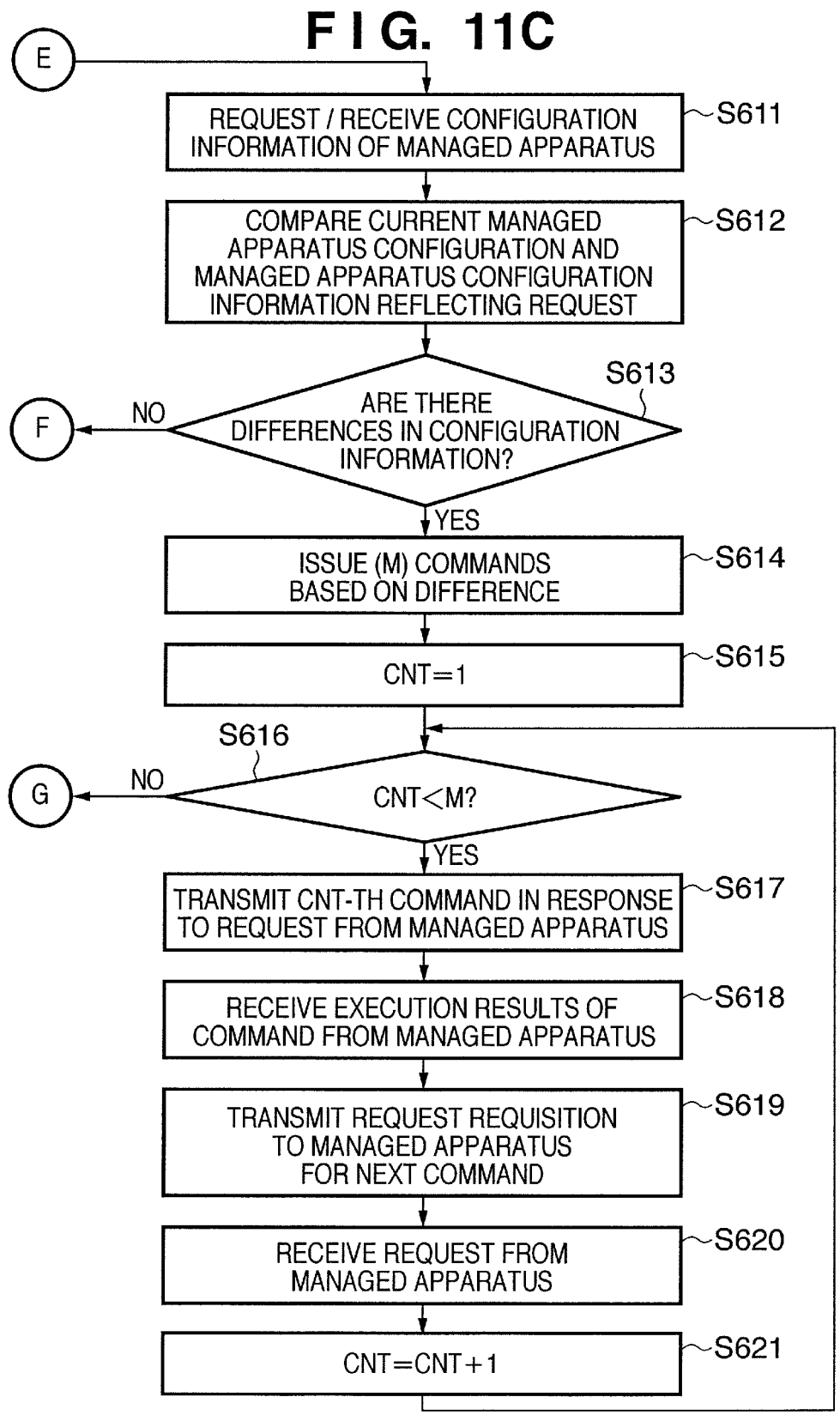

FIG. 12

OUTPUT COMMANDS

| Number | Command | Value |
|---|---|---|
| A | Change Location | Device A, Kawasaki-Building 2F |
| B | Add Device | Device E, Device-3200, 172.16.0.25, Tokyo-Building Room C, Hiroshi Kato |

MANAGED APPARATUS COMMUNICATION SAMPLE 1

| | |
|---|---|
| DATE AND TIME OF DATA TRANSMISSION | ~701 |
| TYPE OF COMMUNICATION | ~702 |
| MANAGED APPARATUS INFORMATION | ~703 |
|     MANAGED APPARATUS ID | ~704 |
|     MANAGED APPARATUS Type | ~705 |
|     MANAGED APPARATUS Version | ~706 |
| COMMAND INFORMATION (COMMAND REQUEST) | ~707 |

MANAGED APPARATUS COMMUNICATION SAMPLE 2

| | |
|---|---|
| DATE AND TIME OF DATA TRANSMISSION | ~701 |
| TYPE OF COMMUNICATION | ~702 |
| MANAGED APPARATUS INFORMATION | ~703 |
|     MANAGED APPARATUS ID | ~704 |
|     MANAGED APPARATUS Type | ~705 |
|     MANAGED APPARATUS Version | ~706 |
| COMMAND INFORMATION (CONFIGURATION REQUEST) | ~708 |

MANAGED APPARATUS COMMUNICATION SAMPLE 3

| | |
|---|---|
| DATE AND TIME OF DATA TRANSMISSION | ~701 |
| TYPE OF COMMUNICATION | ~702 |
| MANAGED APPARATUS INFORMATION | ~703 |
|     MANAGED APPARATUS ID | ~704 |
|     MANAGED APPARATUS Type | ~705 |
|     MANAGED APPARATUS Version | ~706 |
| COMMAND INFORMATION (CONFIGURATION INFORMATION OF MANAGED APPARATUS) | ~709 |
|     URL FOR ACCESS | ~710 |
|     COMMUNICATION SCHEDULE INFORMATION | ~711 |
|     LIST OF MANAGED DEVICES | ~712 |
|         INFORMATION ON DEVICE A | ~713 |
|         INFORMATION ON DEVICE B | ~714 |
|         INFORMATION ON DEVICE C | ~715 |

MANAGEMENT APPARATUS, CONTROL METHOD, AND STORAGE MEDIUM

BACKGROUND OF THE INVENTION

1. Field of the Invention

The present invention relates to management apparatuses utilizing network communication, control method, and storage medium, and in particular, relates to a management apparatus, in which instructions to a managed apparatus that remotely manages devices are processed through a network.

2. Description of the Related Art

Conventionally, maintenance systems managing devices at a customer location through a network from a management server have been known. For example, a conventional maintenance system performs device status acquisition and makes changes in various device settings, etc. In such a case, the management server becomes the initiator which, e.g. accesses a device through an Internet connection and performs the above-mentioned various types of processing.

With the spread of the Internet, etc., security technology has been enhanced and in some cases the way conventional maintenance systems work has resulted in inconveniences. For instance, firewalls have proved an impediment to spontaneous access to customer devices from a management server on the Internet. The problem arising in such environments is the inability to perform sufficient maintenance.

To solve this problem, Japanese Patent Application Laid-Open No. 2002-082792 discloses a system, in which a relay server is provided between a management server and a managed apparatus. In this system, commands issued by the management server are stored in a specific folder on the relay server, the managed apparatus executes monitoring for commands being stored in the specific folder and, if commands are stored in the specific folder, acquires and executes the commands.

However, the system disclosed in Japanese Patent Application Laid-Open No. 2002-082792 requires the provision of additional equipment, i.e. the relay server. Moreover, the relay server merely relays commands and is incapable of exercising flexible control over operating instructions from the management server, e.g. alleviating the load on the network by performing the issuance of commands from the management server in an efficient manner.

SUMMARY OF THE INVENTION

The present invention provides a management apparatus, a control method, and a storage medium that can achieve a sufficient maintenance without adding additional equipment even in security environments equipped with firewalls. Moreover, these management apparatus, control method, and storage medium allow for appropriate instruction control to be exercised when handling a plurality of operating instructions to reduce the number of unnecessary instructions and unnecessary load on the managed apparatus.

According to an aspect of the present invention, a management apparatus is provided which is connectable, through a network, to a managed device located in a network environment utilizing a firewall to disallow spontaneous access through the network from an outside. The management apparatus includes an input unit configured to enter an instruction addressed to the managed device, and an instruction reply unit configured to receive a query from the managed device through the firewall as to the presence/absence of the instruction and, when the instruction entered through the input unit is present, reply with the entered instruction in response to the query in the course of a session established when the query is received, wherein the instruction reply unit, along with replying with one instruction entered in response to the query, maintains the session and, executes another entered instruction according to the response of the managed device to the reply.

According to another aspect of the present invention, a control method is provided for a management apparatus connected to a managed device through a network and managing the managed device. The control method includes acquiring an instruction addressed to the managed device; and receiving a query from the managed device through a firewall as to the presence/absence of the instructions and, when the acquired instruction is present, replying with the acquired instruction in response to the query in the course of a session established when the query is received, wherein, along with replying with a single entered instruction in response to the query, the session is maintained and, another acquired instruction is carried out according to the response of the managed device to the reply.

According to yet another aspect of the present invention, a computer readable medium is provided containing computer-executable instructions for controlling a management apparatus connected to a managed device through a network and managing the managed device. The computer readable medium includes computer readable instruction for acquiring an instruction addressed to the managed device; and computer readable instructions for receiving a query from the managed device through a firewall as to the presence/absence of the instructions and, when the acquired instruction is present, replying with the acquired instruction in response to the query in the course of a session established when the query is received, wherein, along with replying with a single entered instruction in response to the query, the session is maintained and, another acquired instruction is carried out according to the response of the managed device to the reply.

Further features and aspects of the present invention will become apparent from the following description of exemplary embodiments with reference to the attached drawings.

BRIEF DESCRIPTION OF THE DRAWINGS

FIG. 3B is a functional block diagram of an example application program of the management server according to the present embodiment.

FIG. 4A is a view of an exemplary storage configuration of the management server according to the present embodiment.

FIG. 5 is a view of example information transmitted from the management server according to the present embodiment to the managed apparatus.

FIG. 6 is a view of example requests entered in the managed apparatus via the management server according to the present embodiment.

FIG. 7 is a view of example commands transmitted by the management server according to the present embodiment to the managed apparatus.

FIG. 8 is a view of an example configuration information of the managed apparatus managed in the management server according to the present embodiment.

FIGS. 9A to 9C are flowcharts showing example processing wherein, in Operating Example 1, the management server receives a request and transmits a command to the managed apparatus.

FIG. 10 is a view of an example configuration information generated based on a request from the Administrator.

FIGS. 11A to 11C are flowcharts showing example processing wherein, in Operating Example 2, the management server receives a request and transmits a command to the managed apparatus.

FIG. 12 is a view of example commands addressed to the managed apparatus generated by the management server in Operating Examples 2 and 3.

FIG. 17 is a view of example information transmitted from the managed apparatus according to the present embodiment to the management server.

DESCRIPTION OF THE EMBODIMENTS

A description will be given of numerous embodiments, features and aspects of the present invention with reference to the accompanying drawings.

<Exemplary Configuration of Management Apparatus of Present Embodiment>

Figure 1:
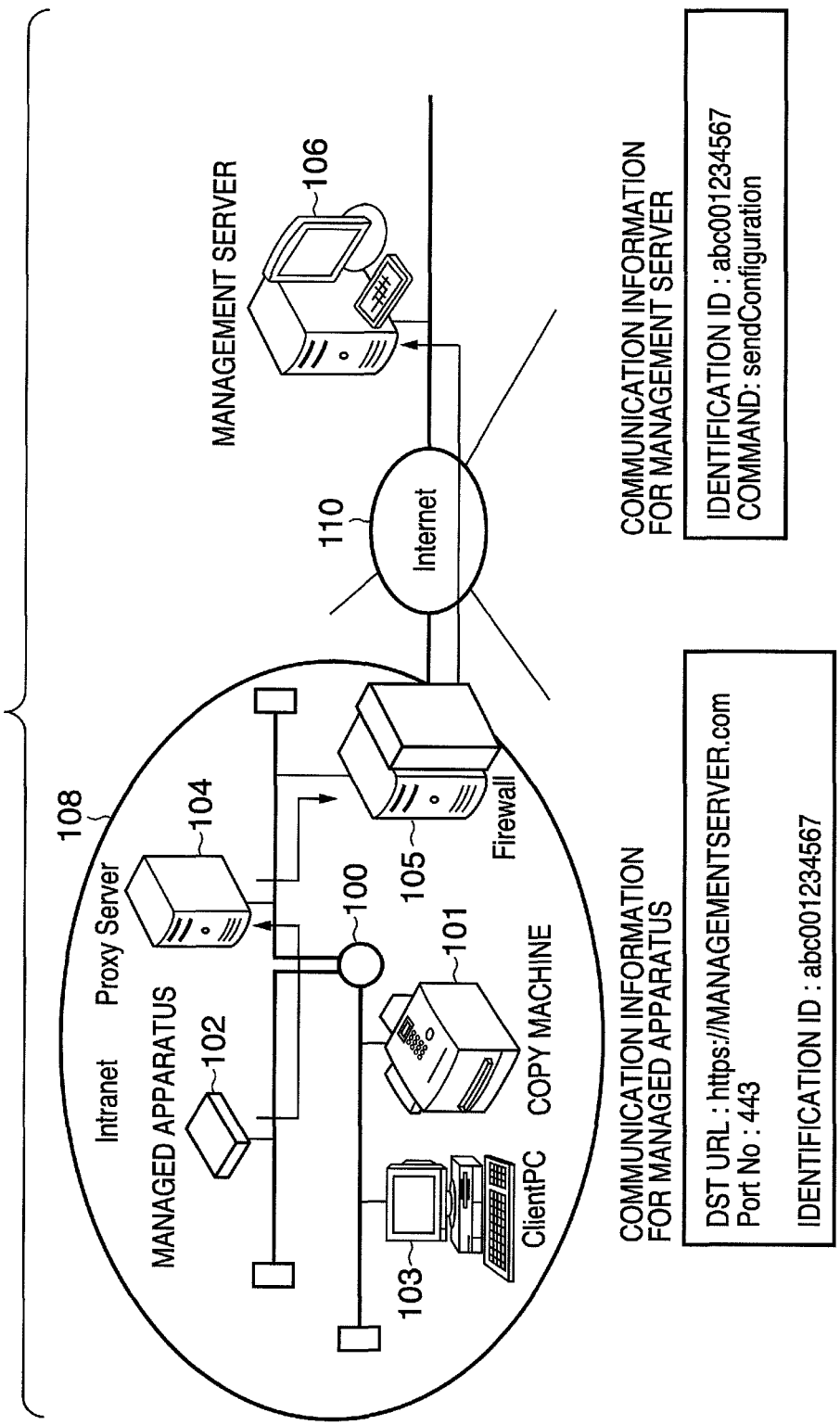
FIG. 1 is a view of an example configuration of a device management system according to the present embodiment, in which a digital copy machine, a managed apparatus, and a management server are connected through the Internet.

FIG. 1 is a view of a configuration of a device management system according to the present embodiment, in which a digital copy machine (hereafter referred to as "the copy machine"), a managed apparatus (managed device), and a management server (management apparatus) are connected through the Internet.

In FIG. 1, the numeral 101 denotes the copy machine. The numeral 102 denotes the managed apparatus, which monitors a state of the copy machine 101 and communicates via the Internet 110 and the management server 106. The numeral 103 denotes a personal computer (client PC) used by an ordinary user for business purposes, etc. The numeral 104 denotes a proxy server supporting the connection of a plurality of users from an intranet 108 to the Internet 110 using protocols such as HTTP and HTTPS. The numeral 105 denotes a firewall set up to enhance the security of the intranet 108. They are connected through a LAN 100.

Generally, a user's client PC on a company's intranet navigates Web pages on the Internet via a proxy server and a firewall. Moreover, what is used in a small-scale network is neither a proxy server, nor a firewall, but rather network router NAT (Network Address Translation) and IP masquerade. This is how connections between Web servers (Web Server) on the Internet and arbitrary client PCs are established from networks within intranets, even small-scale networks. The reason for building such a security environment is that the way the proxy server and the firewall operate allows access from within the company to permit transmission of information to the external Internet. Moreover, another suggested reason is to maintain an established session for a predetermined period of time so as to return only replies from the outside to the originating client PC. In such a security environment, intranet resources cannot be accessed from an Internet environment, and in addition, communications are relayed, making them difficult to tamper with.

The management server 106 centrally manages a operating state of the copy machine 101.

The intranet 108 shows an environment, in which the copy machine 101 and the managed apparatus 102 are connected through the LAN 100. In practice, a plurality of intranets 108 and the management server 106 are connected through the Internet 110.

The managed apparatus 102 communicates through the LAN 100 in accordance with its own communication schedule and acquires a main operating mode configuration of the copy machine 101, operating information, such as counter values and operation logs, and fault information, such as hardware failures and jamming from the copy machine 101. Moreover, the managed apparatus 102 executes configuration information updating, rebooting and other command instructions addressed to the copy machine 101. The communication method used at such time consists in conducting an MIB (Management Information Base) exchange etc. via SNMP (Simple Network Management Protocol).

In the present embodiment, although the managed apparatus 102 is shown as a specific device in FIG. 1, it is sufficient for the device to be a device running a monitoring program. Therefore, there are no limitations concerning the forms of the managed apparatus, which may include cases, wherein a monitoring program is installed on a PC (personal computer) to serve as the managed apparatus or cases wherein a copy machine having a monitoring program built-in serves the functions of the managed apparatus.

The managed apparatus 102 processes the fault information and operating information of the copy machine 101 into communication data and transmits it to the management server 106 through the Internet 110. There are no particular limitations on the communication protocol, although it is assumed that protocols such as HTTP, HTTPS, etc. would be used. For instance, in FIG. 1, the managed apparatus 102 uses HTTPS to transmit data to the management server 106 via the proxy server 104 and firewall 105.

When a typical client PC connects to a Web server on the external Internet, in many cases the customer's intranet already has a security environment utilizing a proxy server and a firewall. Therefore, device status information can be transmitted to the management server without ruining the customer's security environment by applying the proxy server's communication configuration to the managed apparatus. It is noted that such a security environment does not necessarily require a proxy server and a firewall and, in case of a small-scale network, network device such as a router can be installed instead of the proxy server and the firewall. In the above-mentioned environment, the managed apparatus can access the management server from within the customer network and can receive replies therefrom, but it is difficult for the management server to gain access to a managed apparatus installed on the customer's network.

To control the managed apparatus 102, the management server 106 issues commands for the managed apparatus. The managed apparatus 102 periodically (or event-basically) acquires commands from the management server 106 (hereinafter, referred to as the "command request"). Consequently, the commands issued by the management server 106 is stored in the management server 106 until acquisition by the managed apparatus 102.

The acquisition of commands by the managed apparatus 102 is implemented, for instance, by conducting HTTPS communication with the management server 106 using a SSL certificate stored in the managed apparatus. At such time, the management server 106 recognizes that the correspondent is the device to be managed based on initiating communication using a specific SSL certificate. In addition, the managed apparatus 102 has an identification ID (managed apparatus ID) assigned thereto so as to uniquely identify it. After establishing HTTPS communication, the managed apparatus 102 uses a protocol such as SOAP to transmit the identification ID to the management server 106, thereby making it possible for the management server 106 to verify the managed apparatus from which the communication originated. In addition, a specific managed apparatus can be subject to control through the Internet by assigning commands to the response.

(Summary of Communication Sequence of Present Embodiment)

Figure 2A:
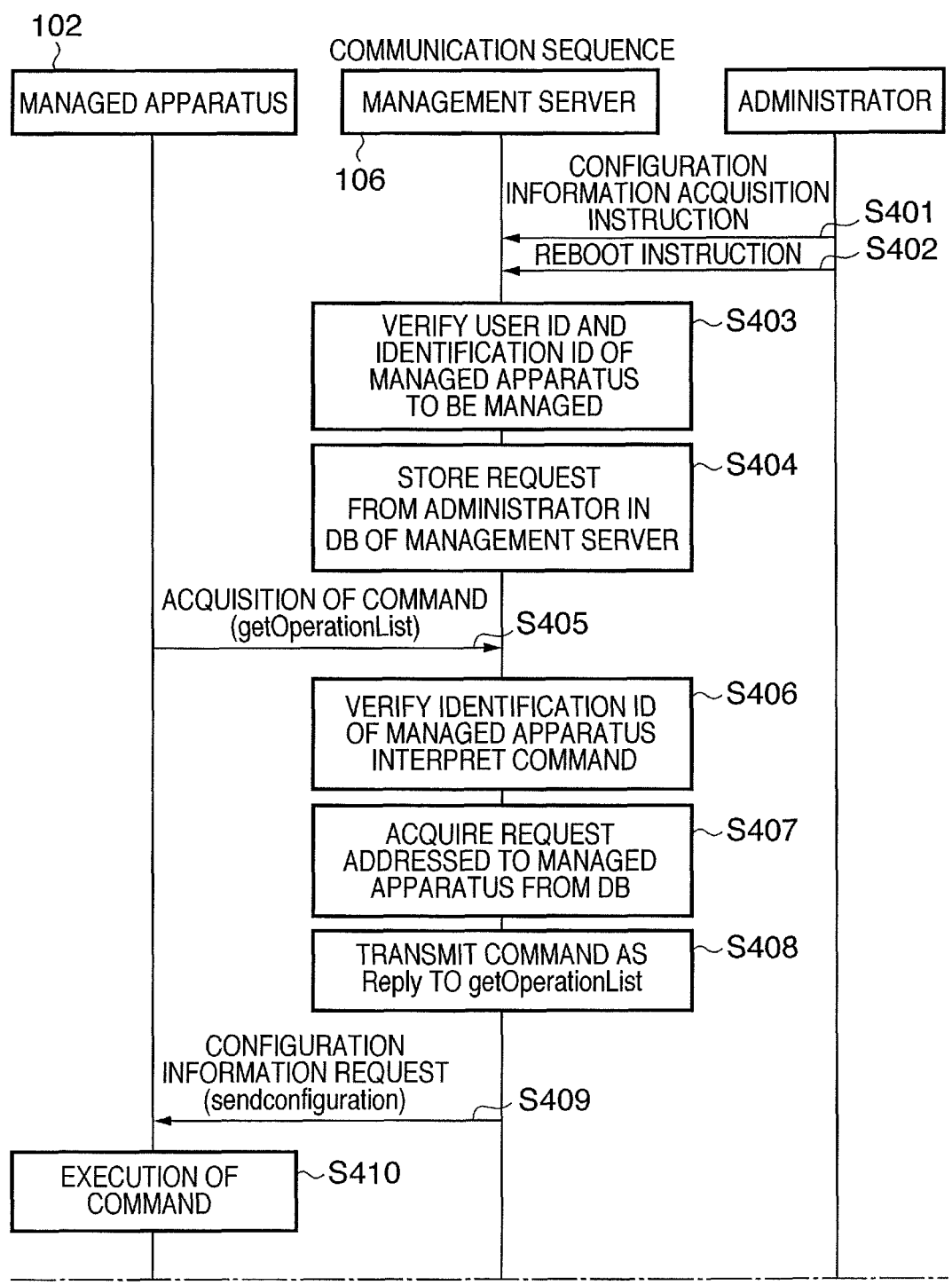
FIGS. 2A and 2B are views of an example communication sequence used between the managed apparatus, the management server, and an Administrator according to the present embodiment.
Figure 2B:
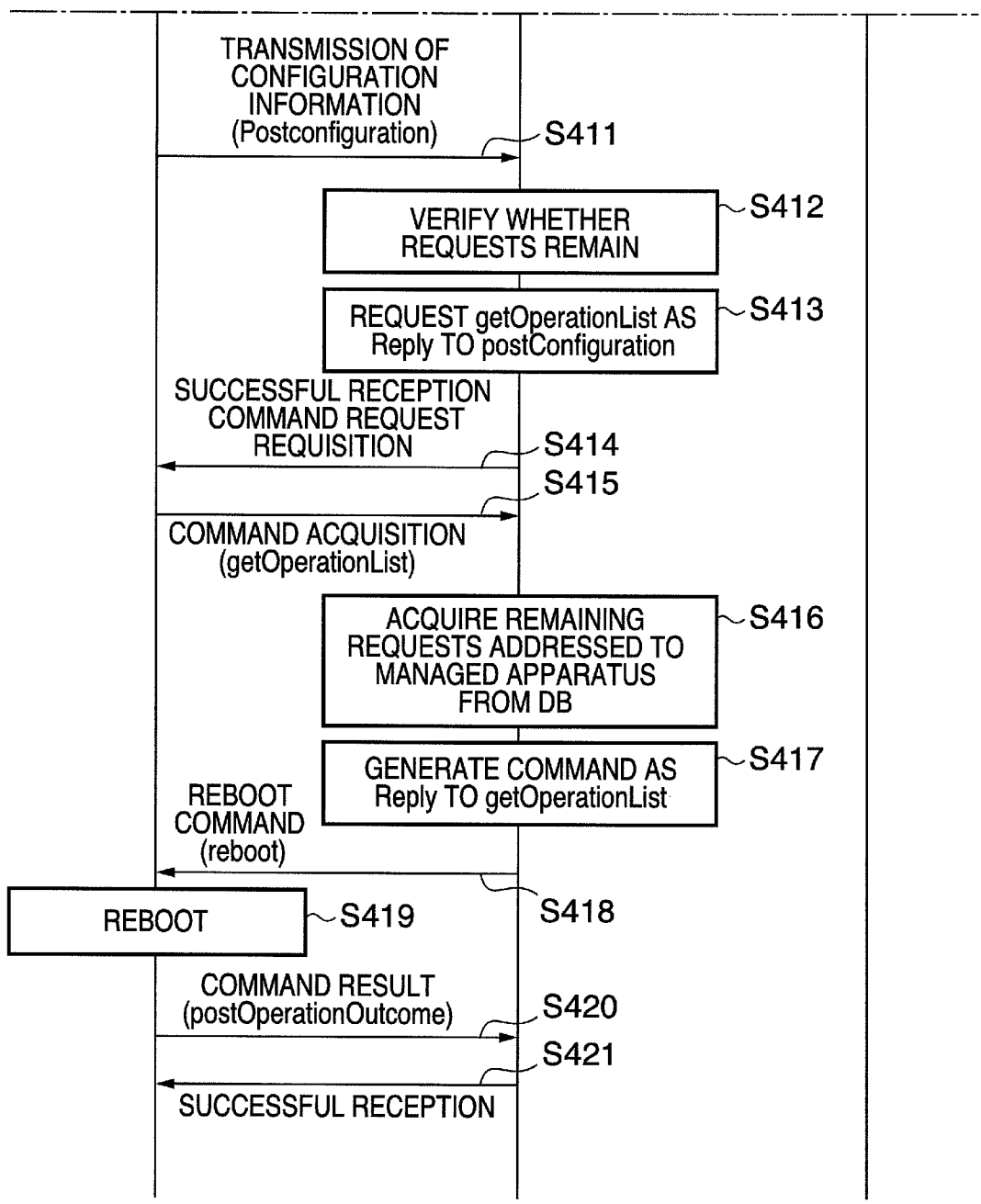

FIGS. 2A and 2B are views of a part of the communication sequence used between the managed apparatus 102, the management server 106, and an Administrator in the present embodiment. It is noted that the Administrator is a maintenance operator issuing operating instructions to the management server 106. FIGS. 2A and 2B show an example of a communication sequence, in which the management server 106 issues "configuration information request" and "reboot request" instructions to the managed apparatus 102, but the invention is not limited to this example.

Sequences S401 and S402 represent entry of commands whereby the Administrator issues instructions to the managed apparatus 102 via the management server 106. In Sequence S401, the Administrator issues an instruction regarding acquisition of the configuration information of the managed apparatus 102 (configuration information acquisition instruction) and, in Sequence S402, an instruction regarding rebooting the managed apparatus 102 (reboot instruction). The example used herein contemplates continuous entry of instructions by the Administrator. An example of the results of such instructions is shown in FIG. 6.

In Sequence S403, the management server 106 responds to the command requested by the Administrator. Using the Administrator's user ID provided during login, the management server 106, using database access control, makes a determination as to whether the Administrator performing the operations has the right to issue commands addressed to the target managed apparatus 102 (identification ID of the managed apparatus). In other words, the management server 106 verifies the user ID and identification ID of the managed apparatus. It is noted that while database access control is used for making such a determination in this embodiment, it is not limited thereto. For instance, an access control mechanism may be provided in an application program. In Sequence S404, in accordance with the determination made in Sequence S403, the management server 106 stores the Administrator's request (Sequences S401 and S402) in the database of the management server 106 as an official request.

Sequence S405 represents a command request (acquisition of command) from the target managed apparatus 102 to the management server 106. When the managed apparatus 102 transmits the command request in Sequence S405, a communication session is initiated by the managed apparatus 102 on its own. In addition, as a result of establishment of the communication session based on the managed apparatus 102 accessing the management server 106 on its own, the management server 106 is enabled to execute various instructions with respect to the managed apparatus 102 across the firewall protecting the managed apparatus 102. This is an inquiry command from the managed apparatus 102 to the management server 106 regarding the presence/absence of commands addressed to the managed apparatus 102.

In Sequence S406, the management server 106 executes authentication of the command request from the managed apparatus 102. Specifically, it verifies the identification ID of the managed apparatus 102 (hereinafter referred to as the "managed apparatus ID") transmitted along with the command request and searches for the managed apparatus ID in the database of the management server 106. Based on the results of the search, the management server 106 verifies whether this is a legitimate managed apparatus and verifies the type of data received from the managed apparatus 102. Because the data received from the managed apparatus 102 is a command request (getOperationList), the management server 106 performs a search in the database to determine whether a command has been issued from the Administrator to the target managed apparatus 102 or not. In Sequence S407, the management server 106 acquires a request addressed to the target managed apparatus 102 from the database.

In Sequence S408, the management server 106 transmits a command to the managed apparatus 102 as a Reply to the command request (getOperationList) from the managed apparatus 102. The command used herein is a command intended for the acquisition of configuration information from the managed apparatus 102. Sequence S409 represents a Reply communication from the management server 106 to the managed apparatus 102. An example of such a Reply is shown in the communication sample 1 of FIG. 5. In Sequence S410, the managed apparatus 102 executes the command received from the management server 106. Because the command used herein is a configuration information acquisition command addressed to the managed apparatus 102, the managed apparatus 102 outputs configuration information.

Sequence S411 includes the transmitting of the results of the command executed in Sequence S410 (configuration information maintained by the managed apparatus 102) from the managed apparatus 102 to the management server 106. In Sequence S412, along with receiving the configuration information of the managed apparatus 102, the management server 106 verifies whether there are requests from the Administrator. When the management server 106 receives data from the managed apparatus 102, it performs authentication using the managed apparatus ID in the same manner as in Sequence S406 and interprets the command and data. The command used at such time relates to configuration information transmission (postConfiguration), with the data being configuration information maintained by the managed apparatus 102. In the present embodiment, after storing the results of the command in the database, the management server 106 recognizes that there are requests (reboot instructions) addressed to the managed apparatus 102.

In Sequence S413, the management server 106 issues an instruction instructing the managed apparatus 102 to carry out the command request (getOperationList) In other words, a command request (getOperationList) is requested as a Reply to the transmission of the configuration information (postConfiguration). In Sequence S414, along with informing the managed apparatus 102 of the successful reception of the previous command, the management server 106 instructs it to request the command request (getOperationList). An example of the Reply given at such time is shown in the communication sample 2 of FIG. 5. Sequence S415 represents a command request (command acquisition) from the managed apparatus 102 to the management server 106.

In Sequence S416, the management server 106 acquires the remaining command, i.e. a reboot command, from the database. In Sequence S417, the management server 106 generates a reboot command as a Reply to the command request (getOperationList).

In Sequence S418, the management server 106 transmits the reboot command to the managed apparatus 102. An example of the Reply given at such time is shown in the communication sample 1 of FIG. 5. In Sequence S419 the managed apparatus 102 executes a reboot. In Sequence S420, the managed apparatus 102 informs the management server 106 of the completion of the reboot event (command result). In Sequence S421, the management server 106 informs the managed apparatus 102 of the problem-free reception (successful reception) of the communication of Sequence S420. Because here the management server 106 does not have a command to transmit to the managed apparatus 102, only a Reply is returned without requesting a next command. The management server 106 then terminates the established session on its own. In addition, the established session is terminated as a result of a time-out when a predetermined time passes without the management server 106 acting on its own.

In the present embodiment, when there is a command request (getOperationList) from the managed apparatus 102 to the management server 106, such a command request serves as a trigger to sequentially execute instructions from the Administrator held in the management server 106. This is implemented based on the management server 106 requiring a command request (getOperationList) from the managed apparatus 102 until the execution of instructions from the Administrator is over.

In addition, although explanations in the example of the communication sequence shown in FIGS. 2A and 2B describe issuing instructions regarding additional commands from the management server 106 to the managed apparatus 102 through the processes in Sequences S413 to S415, the invention is not limited to this embodiment. For example, additional commands may be transferred in response to the reply from the managed apparatus 102 in Sequence S411. In this manner, in the present embodiment, the established session is maintained and further instructions can be executed according to the reply to the instructions from the managed apparatus 102 (Sequence S411). Therefore, it is possible to reliably execute high-level instructions addressed to the managed apparatus 102 across the firewall.

In addition, in the example of the communication sequence shown in FIGS. 2A and 2B, after the management server issues a command instruction to the managed apparatus, the managed apparatus executes processing without fail, during which command execution results are communicated to the management server. If there are additional commands to be executed, the management server receiving the command execution results outputs information indicating that a subsequent command is ready as a Reply to the command execution results to instruct the managed apparatus to execute a command request communication. On the other hand, cases are also contemplated, in which the management server transmits a plurality of commands to the managed apparatus at once in order to allow the managed apparatus to process a plurality of commands. Here, a comparison between a method, in which a plurality of commands is processed by repeating one command multiple times, with a method, in which a plurality of command sets is transmitted once, shows that the method of processing a plurality of commands by repeating one command multiple times has the following effects. Verification is easy because processing results of the commands issued by the management server are received one by one. In addition, after receiving and verifying the result of a single command, it is possible to determine the command to be transmitted next, and therefore, command flexibility is increased. In addition, the managed apparatus receiving the commands does not require the hardware resources necessary for the processing of a plurality of commands together.

<Exemplary Configuration of Management Server of Present Embodiment>

(Exemplary Hardware Configuration of Management Server)

Figure 3A:
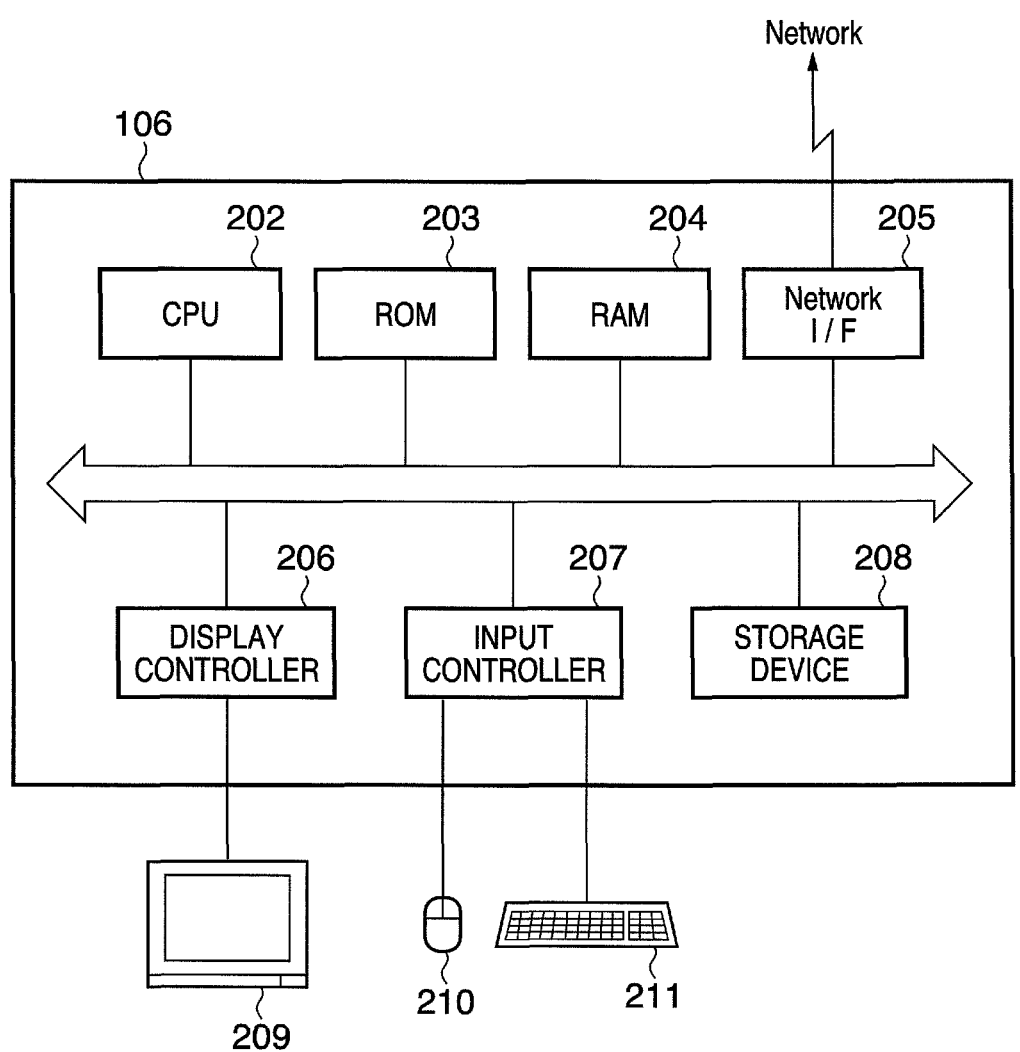
FIG. 3A is a block diagram of an example hardware configuration of the management server according to the present embodiment.

FIG. 3A is a block diagram of the hardware configuration of the management server 106 shown in FIG. 1. The management server 106 is constituted, for instance, by a general-purpose computer, etc. The management server 106 includes a CPU 202 used for overall control, a ROM 203 serving as a read-only memory for storing a boot program necessary for system startup, and a RAM 204 serving as a working memory used when executing programs in the CPU 202. In addition, the management server 106 includes a network interface (I/F) 205 used for conducting communication on the network and a display controller 206 used for displaying the contents of communication with the managed apparatus on a display device 209. Furthermore, the management server 106 includes devices 210 and 211 serving as input unit for the Administrator managing the management server 106 and an input controller 207 receiving input from the Administrator. Furthermore, the management server 106 includes a storage device 208, such as a magnetic disk, etc., which stores operating information etc. of the copy machines sent from the managed apparatus 102 and programs executed in the CPU 202.

The management server 106 receives periodically operating information notifications, non-periodically fault condition notifications, and command requests from the managed apparatus 102 through the network interface I/F 205. In addition, the management server 106 receives, through the input controller 207, command inputs addressed to the managed apparatus 102 from the Administrator, such as reconfigurations, operational requirements, etc.

The periodically communicated operating information includes various counter values, operation logs, etc., with the management server 106 using the operating information to calculate a periodic maintenance fee, which is submitted on a monthly basis to the customer who owns the copy machine 101. In addition, information on the extent of wear of parts used in the copy machine 101 relative to their recommended useful life is outputted in report form by the management server 106. The management server 106 sequentially stores the periodically communicated operating information in the storage device 208. On the other hand, the Administrator determines the amount to be invoiced to the customer by appropriately referring to the operating information stored in the storage device 208.

In addition to the operating information, the non-periodically communicated information indicating fault conditions in the copy machine 101 contains error/alarm information on various hardware failures, jamming, etc. that may occur. Upon receipt of such information, the management server 106 determines processing based on the degree of urgency of the information. For instance, if the received information is represented by information on a failure requiring immediate recovery, such as a malfunction of the copy machine 101, an e-mail message is sent to the Administrator managing the copy machine 101 in question. Furthermore, along with sequentially storing the received information in the storage device 208, displaying information on the display device 209 allows the management server 106 to notify the Administrator that the copy machine 101 is in a fault condition. On the other hand, when the degree of urgency of the received information is low, such as in the case of jamming or alarms, the management server 106, along with sequentially storing such information in the storage device 208, makes a decision regarding whether sending an e-mail message is necessary and whether displaying on the display device 209 is necessary.

The Administrator determines the condition of the copy machine 101 based on the contents of the display displayed on the display device 209 and, if necessary, gives instructions to a repairman to perform failure restoration work. In addition, consumables such as toner etc. are sent to the customer.

Command requests from the managed apparatus 102 are received at any time. Whenever a command request is received from the managed apparatus 102, the management server 106 checks the storage device 208 of the management server 106 and, if any commands addressed to the managed apparatus 102 have been set by the Administrator, transmits such commands to the managed apparatus 102.

(Exemplary Software Configuration of Management Server)

FIG. 3B is a block diagram of the functions of an application program executing the issuance of commands addressed to the managed apparatus 102 in the management server 106. The application program includes a command input unit 305 receiving input from the Administrator. In addition, the application program includes a reconfiguration storage unit 302 used for storing reconfiguration commands addressed to the managed apparatus 102 received by the command input unit 305. In addition, the application program includes a reconfiguration information I/O unit 304 used for input and output of reconfiguration commands addressed to the managed apparatus 102 to/from the reconfiguration storage unit 302. Furthermore, the application program includes a configuration storage unit 301 for storing the current configuration of the managed apparatus 102 and a configuration information I/O unit 303 for input and output of the configuration information of the managed apparatus 102 to/from the configuration storage unit 301.

Moreover, the application program includes a communication I/F unit 306 communicating with the managed apparatus 102. In addition, the application program includes a communication command interpretation unit 309, which extracts identification IDs and communication commands in data form from the data received from the managed apparatus 102 or converts the data transmitted to the managed apparatus 102 into a communication format. In addition, the application program includes a configuration comparison/command issuance unit 307, which compares information used for changing configuration in accordance with the Administrator's request and the original configuration of the managed apparatus 102 and issues the appropriate command. Moreover, the application program includes a command controller 310 exercising command control over the managed apparatus 102 with respect to the number of issued commands, the number of commands designated for execution, the results of the commands, etc. Furthermore, the application program includes a command result display unit 308, which displays the results of commands addressed to the managed apparatus 102, and a command result storage unit 311, which stores the results of commands addressed to the managed apparatus 102.

In the preferred example below, a commands entered by the Administrator via the command input unit 305 is temporarily stored in the reconfiguration storage unit 302. Then, upon receipt of a command request from the managed apparatus 102, the configuration comparison/command issuance unit 307 compares configurations or verifies the commands and appropriately changes the commands that affect each other. Thus, the command entered by the Administrator is not transmitted to the managed apparatus 102 "as is"; instead, it is generated in appropriate form to exclude unnecessary operations and permit suppression of causes leading to a system failure.

(Exemplary Storage Configuration of Management Server)

FIG. 4A is a view of the configuration of programs and data nonvolatile-stored in the storage device 208 or ROM 203 shown in FIG. 3A. It is noted that FIG. 4A shows only the program and data associated with the present embodiment, with other programs and data omitted.

The numeral 401 denotes system program (OS) exercising basic control over the device. The numeral 402 denotes a device management program, which exercises overall control over device management by the management server 106. The parts associated with the present embodiment of such a device management program 402 are described later with reference to FIGS. 9A to 9C, FIGS. 11A to 1C, and FIGS. 14A to 14C. The numeral 403 denotes a user interface program controlling instruction input by the Administrator or display output of device status, etc. The user interface program 403 includes a user-input command analysis function, which analyzes commands entered by the Administrator and generates commands that are transmitted to the managed apparatus 102. The numeral 404 denotes an Administrator/managed apparatus authentication program used to authenticate the Administrator who enters an instruction or the managed apparatus 102 that transmits a command request.

The numeral 405 denotes a message transmit/receive program controlling message transmission/reception including commands with the managed apparatus 102 via the Internet 110. The numeral 406 denotes a received command analysis program analyzing commands contained in messages received from the managed apparatus 102 and issuing instructions regarding the execution of the corresponding processing. The numeral 407 denotes processing programs executed in accordance with the analytical results of the received command analysis program 406. If the analytical result of the received command analysis program 406 is a command request, the processing programs 407 execute request transmission processing 407a. If the analytical result of the received command analysis program 406 is configuration information, the processing programs 407 execute configuration information reception processing 407b. Moreover, if the analytical result of the received command analysis program 406 is device status, the processing programs 407 execute status reception processing 407c. It is noted that while the description provided here relates to received commands associated with the present embodiment, the invention is not limited thereto.

The numeral 408 denotes a command table used to store commands associated with processing performed by the management server 106. In the present embodiment, the command table 408 includes input commands 408a corresponding to instructions entered by the Administrator, transmitted commands 408b transmitted to the managed apparatus 102, and received commands 408c received from the managed apparatus 102. Among these commands, the input commands 408a and transmitted commands 408b are preferably interrelated. Examples of the input commands 408a are shown in FIG. 6, examples of the transmitted commands 408b are shown in FIG. 7, and examples of the received commands 408c are shown in FIGS. 2A and 2B.

The numeral 409 denotes a managed apparatus configuration information database (DB) holding the configuration information of the managed apparatus 102. FIG. 8 shows an example of the managed apparatus configuration information DB. The numeral 410 denotes a managed apparatus database (DB) storing managed apparatuses 102 managed by the management server 106. The managed apparatus DB 410 stores, for instance, an ID 411 of device 1 used for the authentication of the managed apparatus 102 and a user ID 411a of the Administrator with access rights, which is used for authenticating the Administrator. Moreover, the managed apparatus DB 410 stores the number (N1) 411b of stored commands entered by the Administrator and the transmitted commands 11 ... (411c) corresponding to the commands entered by the Administrator. Furthermore, for device 2, the managed apparatus DB 410 stores a device ID 412, a user ID 412a, a stored command number (N2) 412b, and commands 21 ... (412c).

Figure 4B:
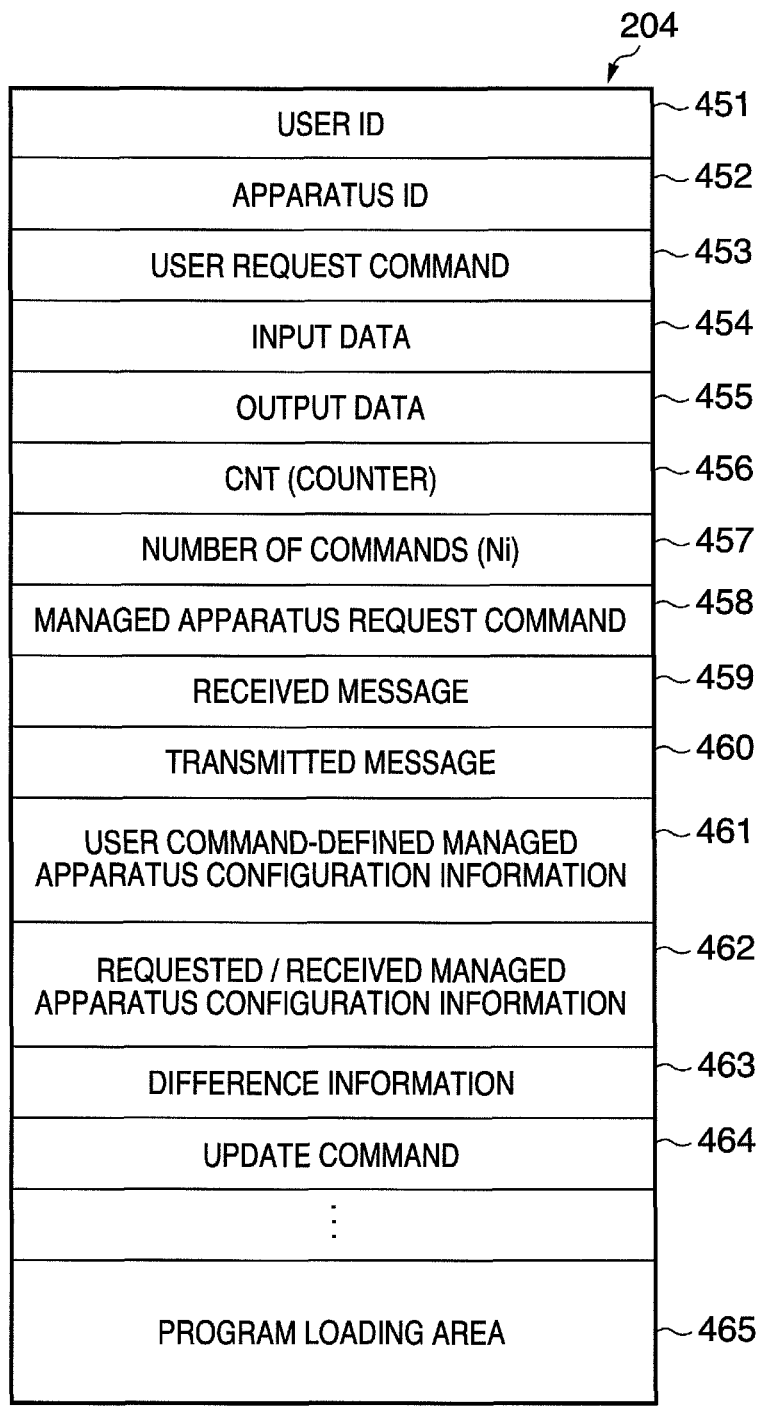
FIG. 4B is a view of an exemplary storage configuration of the management server according to the present embodiment.

FIG. 4B is a view of the configuration of data temporarily stored in the RAM 204 shown in FIG. 3A. It is noted that FIG. 4B shows only the program and data associated with the present embodiment, with other programs and data omitted.

The numeral 451 denotes a storage area for user IDs entered by the Administrator. The numeral 452 denotes an apparatus ID transmitted from the managed apparatus 102. The numeral 453 denotes a user request command entered by the Administrator. The numeral 454 denotes various data (input data) entered by the Administrator via the input controller 207. The numeral 455 denotes various data (output data) displayed via the display controller 206. The numeral 456 denotes a counter (CNT) counting the number of commands transmitted in succession. The numeral 457 denotes the number of commands (Ni) stored for the respective managed apparatus.

The numeral 458 denotes a managed apparatus request command transmitted from the managed apparatus 102. The numeral 459 denotes a message received from the managed apparatus 102 and the numeral 460 denotes a message transmitted to the managed apparatus 102. The numeral 461 denotes the configuration information of the managed apparatus 102 as changed by a user command (user command-defined managed apparatus configuration information). An example of the managed apparatus configuration information is shown in FIG. 10. The numeral 462 denotes the configuration information of the managed apparatus 102 (requested/received managed apparatus configuration information) received upon issuing a request addressed to the managed apparatus 102. The numeral 463 denotes difference information between the user command-defined managed apparatus configuration information 461 and the requested/received managed apparatus configuration information 462. The numeral 464 denotes an update command produced by reducing the transmitted command based on the difference information 463. And, the numeral 465 denotes a storage area used for loading for the CPU 202 to execute the program shown in FIG. 4A.

(Exemplary Configuration of Communication Data from Management Server)

FIG. 5 is a schematic view of commands and data transmitted from the management server to the managed apparatus. Such information (commands and data) is generated in the form of the transmitted message 460 shown in FIG. 4B.

In FIG. 5, the numeral 801 denotes information (response to command request) contained in a Reply corresponding to a command request received by the management server 106 from the managed apparatus 102. Furthermore, the numeral 801, along with being a Reply from the management server 106 to the managed apparatus 102, includes the results of communication of the received information and commands whereby instructions are issued to the managed apparatus 102 from the management server 106. Here, the "commands" correspond to Sequence S418 (reboot command) and Sequence S409 (configuration information request) shown in FIG. 2A, for example.

A code showing the result of communication of the command request received by the management server 106 from the managed apparatus 102 (successful or unsuccessful) is outputted in 802. A time and date indicating when the command request received by the management server 106 from the managed apparatus 102 was processed (time and date when processing was completed) is outputted in 803 and, if the processing is unsuccessful, a detailed explanation of the events at the time of unsuccessful reception (if a communication error occurs) is outputted in 804. Command information transmitted by the management server 106 to the managed apparatus 102 is outputted in 805. It is outputted if there is a command supposed to be issued by the management server 106 to the target managed apparatus 102. Information supplementing the commands of 805 is outputted in 806. For instance, in the present embodiment, an instruction is issued about adding a monitored device to the managed apparatus 102 and information on Device E, as a device to be managed, is outputted in 806. In practice, information used for the managed apparatus 102 to manage the device, such as an IP Address, identification ID, etc., is outputted in 806.

The numeral 807 denotes information (command information) transmitted to the managed apparatus 102 when it is necessary for the management server 106 to issue another command to the managed apparatus 102. The management server 106 receives the result of the previous command transmitted to the managed apparatus 102 and transmits the next command as a Reply to the managed apparatus 102. Such Reply information corresponds to Sequence S414 (successful reception/command request) shown in FIG. 2B. A command (command request invocation command), whereby management server 106 again issues an instruction to execute a command request to the managed apparatus 102, is outputted in 808.

(Example of Input Commands Addressed to Management Server)

FIG. 6 is a view of an example, wherein the Administrator enters a plurality of commands addressed to the managed apparatus 102 via the management server 106. FIG. 6 shows device configuration information update commands, and not the configuration information request or reboot command shown in FIGS. 2A and 2B.

In FIG. 6, in 1101, a request is issued to change the location of installation, which constitutes attribute information for Device A managed by the managed apparatus 102. In 1102, a request to the managed apparatus 102 is issued for Device D, which is a new device, to be subject to monitoring. The numeral 1103 denotes a command used to correct previously entered installation location information for Device A. In the present embodiment, the installation location, which constitutes attribute information for Device A, is further updated. In 1104, a request to the managed apparatus 102 is issued for Device E, which is a new device, to be subject to monitoring. In 1105, a request is issued to cancel registration of Device D, which was performed in 1102, and to delete Device D as a device subject to monitoring.

If there are no command requisitions from the managed apparatus 102 even though a request has been issued by the Administrator to the managed apparatus 102, the management server 106 cannot transmit the request to the managed apparatus 102. Therefore, if requests entered in the management server 106 are not processed in real time, commands are accumulated in the management server. Hereinafter, explanations are provided regarding an example, in which the five commands shown in FIG. 6 are reduced in number.
(Example of Commands Addressed to Managed Apparatus from Management Server)

FIG. 7 is a view of commands transmitted by the management server 106 to the managed apparatus 102. The commands shown in FIG. 7 are set in the command information 805 shown in FIG. 5 described above.

The management server 106 contains records of transmitted commands corresponding to commands entered by the Administrator in association with the managed apparatuses. In this case, if these are the input commands shown in FIG. 6, then assignment is executed to separate managed apparatuses for device unit, or in case of the managed apparatus managing a plurality of devices, instructions addressed to the plurality of devices are assigned to that managed apparatus. The management server 106 then controls the managed apparatuses using these commands. It is noted that these commands are merely an example and they are not limited thereto.

The numeral 1001 denotes a requisition regarding adding a monitored device asking the managed apparatus 102 to manage a new device. The numeral 1002 denotes a requisition regarding attribute change for monitored device used when updating the attribute information of the devices being currently managed by the managed apparatus 102. The numeral 1003 denotes a requisition regarding deletion of monitored device used when deleting monitored devices registered in the managed apparatus 102. The numeral 1004 denotes a requisition regarding communication schedule change used when changing scheduling information used for periodic communication set up in the managed apparatus 102. It is noted that the contents of the requisition described in 1005 through 1011 are as shown in FIG. 7 and detailed explanations thereof are omitted herein.
(Exemplary Configuration of Managed Apparatus Configuration Information)

FIG. 8 is a view of an example of configuration information held in the managed apparatus configuration information DB 409 of the management server 106. FIG. 8 shows configuration information held for each managed apparatus ID. The numeral 1201 denotes configuration information relating to the target managed apparatus, with there being three monitored devices managed in FIG. 8. Hereinafter, explanations are provided regarding an operating example, in which, during entry of a plurality of commands corresponding to the Administrator's instructions, the management server 106 optimizes the input commands and transmits the optimized commands to the managed apparatus 102. In such an operating example, in the configuration example of FIG. 8, when the Administrator enters the plurality of commands shown in FIG. 6 into the management server 106, the management server 106 performs optimization to produce the commands shown in FIG. 12 and transmits the optimized commands to the managed apparatus 102.

It is noted that the same configuration information is stored in a configuration information DB 1607 of the managed apparatus 102, which is described later. When a plurality of managed apparatuses are managing one device respectively, the configuration information shown in FIG. 8 is collected from three managed apparatuses. On the other hand, there are cases, in which a single managed apparatus manages a plurality of devices.

The numeral 1202 denotes configuration information for Device A, the numeral 1203 denotes the product name of Device A, the numeral 1204 denotes the IP address of Device A, the numeral 1205 denotes the installation location (Kawasaki Building, 3rd Floor) of Device A, and the numeral 1206 denotes the name of the Administrator.

Configuration information for Device B is described in items 1207 through 1211 and configuration information for Device C is described in items 1212 through 1216. Device B and Device C are located in the same building (Tokyo Building) and thus it is possible to contemplate an arrangement, in which they would be managed by a single managed apparatus.
<Operating Example 1 of Management Server of Present Embodiment>

Operating Example 1 of the management server 106 of the present embodiment will be explained based on the above-mentioned configuration. It is noted that explanations are provided on the assumption that, in order to simplify processing in the Operating Examples 1 through 3 described later, the devices corresponding to the input commands shown in FIG. 6 are managed with the help of the same managed apparatus. However, in practice, a plurality of managed apparatuses manage devices and in a such case, independent processing is executed for each managed apparatus.

In Operating Example 1, explanations are provided with respect to an example, wherein commands from the Administrator are entered and, as shown in FIG. 6, there are five commands held in the database, which are executed in a sequential manner.
(Exemplary Operating Procedure of Operating Example 1)

Figure 9B:
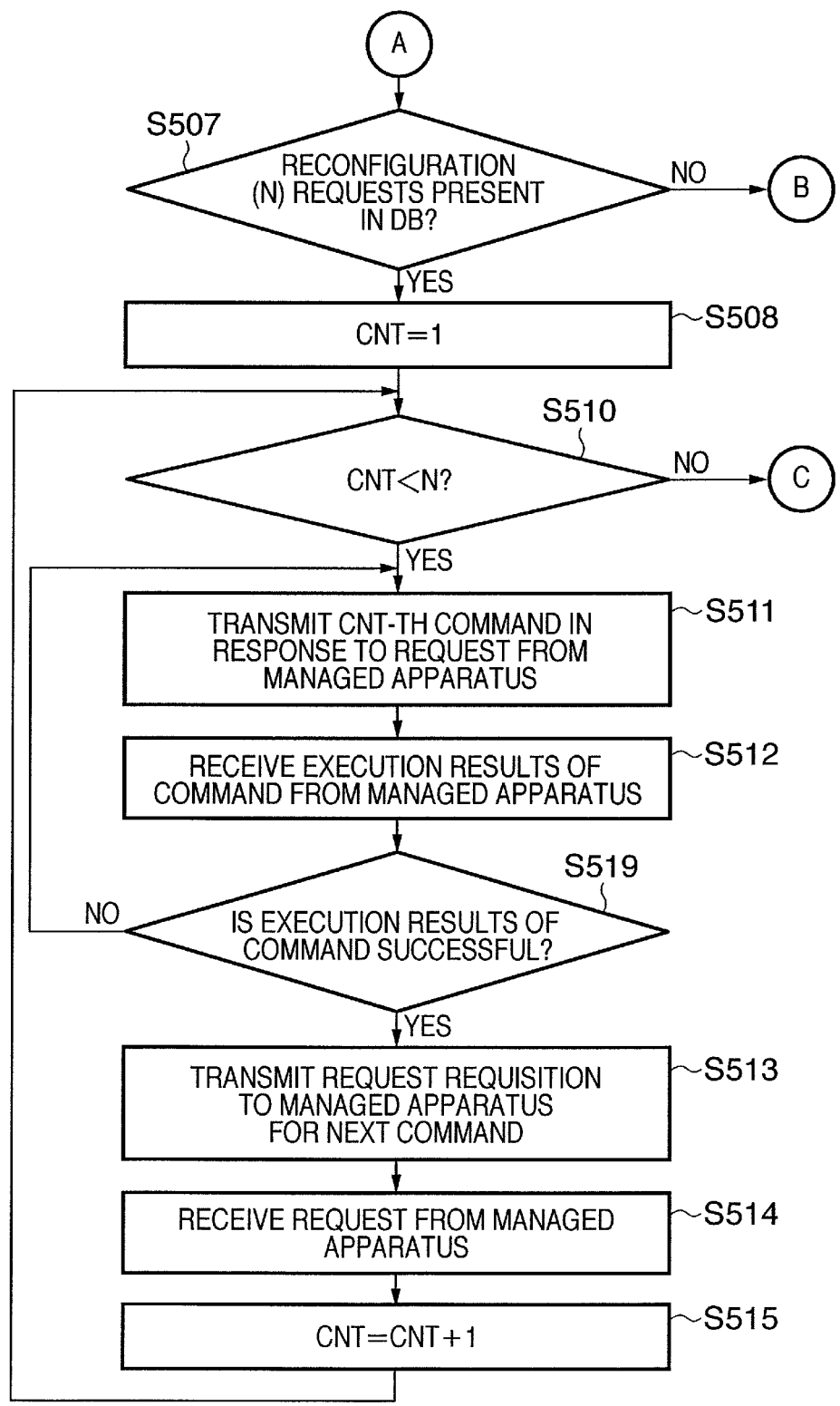
Figure 9C:
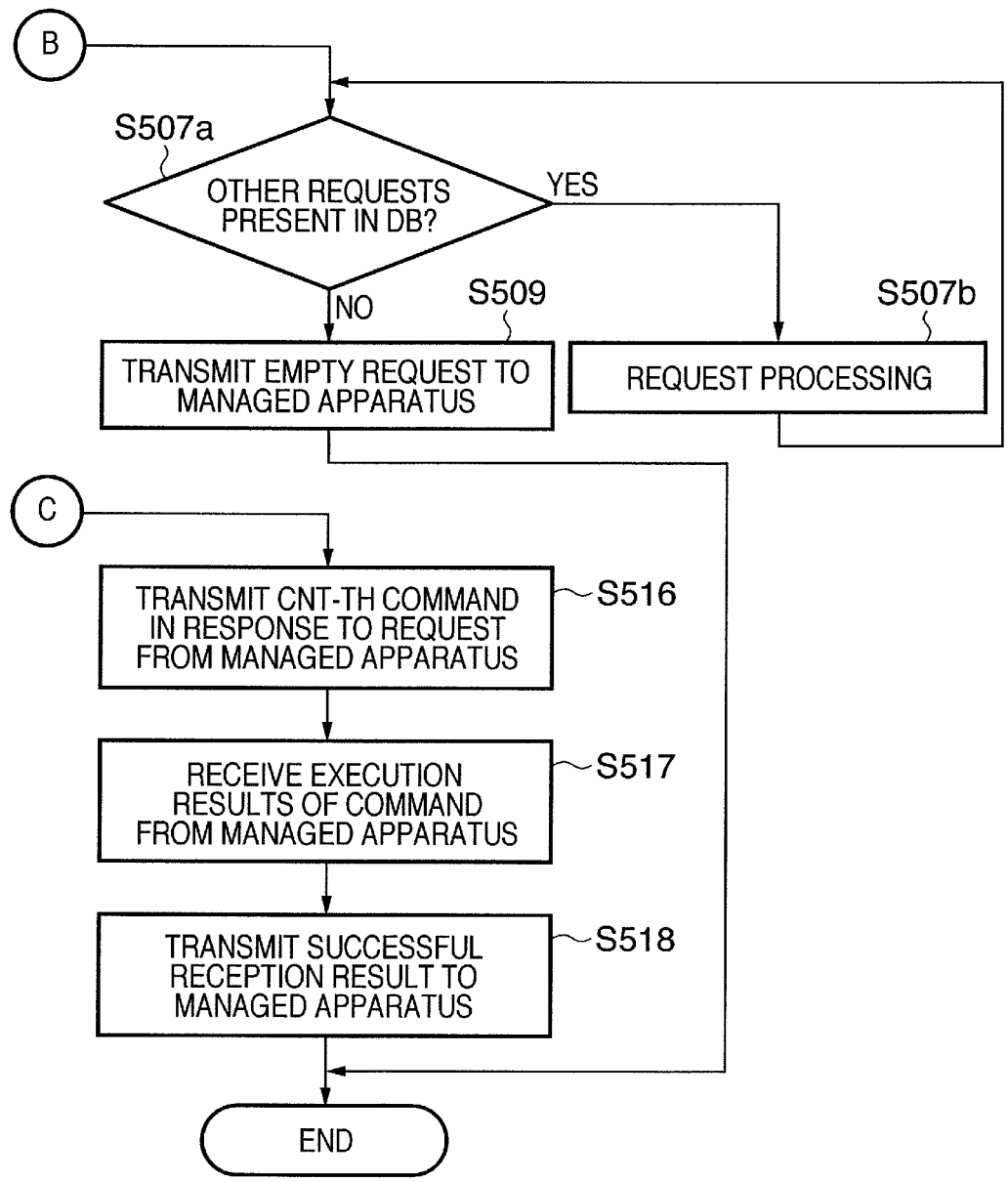

FIGS. 9A to 9C are flowcharts of processing wherein, the management server 106 receives an Administrator request and transmits a command to the managed apparatus 102. The characteristic feature of the operating example of the flowcharts shown in FIGS. 9A and 9C is that when a plurality of requests are received from the Administrator, the management server 106 issues a request to the managed apparatus 102 so that all the multiple commands be processed. In other words, when the management server 106 transmits the request to the managed apparatus 102, the managed apparatus command request is transmitted to the managed apparatus 102 according to the number of commands so as to permit confirmation of the result of each one of the plurality of commands.

A loop is started in Step S501 for internal processing in the management server 106. In Step S502, the management server 106 receives a request from the Administrator through the user interface. Because generation of other requests from the Administrator, or absence of generation of requests, is possible here, the management server 106 makes a determination as to the request from the Administrator. Specifically, the management server 106 determines whether the request from the Administrator is a reconfiguration request and, if it is not the reconfiguration request, then in Step S502a, it is determined whether it is the other request. If in Step S502 it is determined that the reconfiguration request is received from the Administrator, then in Step S503, the management server 106 stores the reconfiguration request in the database. Such a database corresponds to the managed apparatus DB 410 shown in FIG. 4A. If in Step S502 the request from the Administrator is not the reconfiguration request, then in Step S502a the management server 106 determines whether it is the other request (for instance, a configuration information request or reboot request, etc.). If the request from the Administrator is the other request, then in Step S503a the management server 106 stores the other request in the database. Here, a case is contemplated, wherein instructions from the Administrator are inputted in succession, with an example of input results of Step S501 through Step S503 shown in FIG. 6. If the request from the Administrator is not the other request, the process proceeds to Step S504.

In Step S504, the loop ends. As for the conditions for loop ends, the processing of the loop ends when a determination is made as to the presence/absence of the command request from the managed apparatus 102 and it is determined that there is the command request from the managed apparatus 102 (when the command request is received from the managed apparatus 102). If the command request is received from the managed apparatus 102 in Step S504, then a session is established in the same manner as in Sequence S405. Therefore, commands entered by the Administrator while there are no command requests received from the managed apparatus 102 are sequentially accumulated as shown in FIG. 6. If the command request is received from the managed apparatus 102 then, in Step S505, the management server 106 searches the database for the managed apparatus ID received through communication and executes managed apparatus authentication. In Step S506, the management server 106 performs a search to determine whether commands (reconfiguration requests) addressed to the target managed apparatus is stored in the database. In Step S507, the management server 106 determines whether there are reconfiguration commands (reconfiguration requests) addressed to the managed apparatus 102. If according to the determination made in Step S507 there are no reconfiguration commands addressed to the managed apparatus 102, in Step S507a, the management server 106 determines whether there are other requests. If there are other requests, the management server 106 executes the corresponding request processing in Step S507b. If there are no other requests, in Step S509, the management server 106 transmits an empty request to the managed apparatus 102 and terminates processing.

If there are one or more (N) requests (commands) in Step S507, then in Step S508, the management server 106 resets the value of the counter CNT to CNT=1. In Step S510, the management server 106 compares the value of the counter CNT and the number N of the commands. If the value of the counter CNT is less than the number N of commands, then in Step S511 the management server 106 transmits the CNT-th command to the managed apparatus 102 (in response to a request therefrom). In Step S512, the management server 106 receives the execution results of the CNT-th command transmitted to the managed apparatus 102 in Step S511. In Step S519, based on the execution results of command received in Step S512, the management server 106 makes a determination as to whether the command result has been successful. In other words, the management server 106 makes a determination as to whether to execute preparation for performing transmission of the next command or execute other processing. If in Step S519 it is determined that the command results are successful, it proceeds to Step S513 in order to prepare for the transmission of the next command. On the other hand, if in Step S519 it is determined that the command result is unsuccessful (if the previous command transmitted to the managed apparatus has failed), then it goes back to Step S511 to transmit the same command again. Based on the determination processing performed in Step S519, a series of commands addressed to the managed apparatus can be issued in a more reliable manner. In Step S513, for the next command, the management server 106 transmits a requisition for a command request to the managed apparatus 102. In Step S514, the management server 106 receives a command request from the managed apparatus 102 as a result of the instruction of Step S513. The command request from the managed apparatus 102 corresponds to the getOperationList method. In Step S515, the management server 106 increments the value of the counter CNT by one.

If in Step S510 the value of the counter CNT reaches the number (N) of commands, then in Step S516 the management server 106 transmits the CNT-th (Nth) command to the managed apparatus 102 (in response to a request therefrom). In Step S517, the management server 106 receives the result of the command transmitted to the managed apparatus 102 in Step S516 (execution result of command by the managed apparatus 102). In Step S518, the management server 106 transmits the result of successful communication (successful reception) in Step S517 to the managed apparatus 102. The session that has been maintained is then terminated by the management server 106 on its own or as a result of a time-out.

In addition, although the above explanations describe instructions regarding the issuance of further commands from the management server 106 to the managed apparatus 102 based on the processing performed in Steps S513 and S514, the invention is not limited to this embodiment. For example, in order to transmit further commands in response to the reply from the managed apparatus 102 in Step S519, processing may be set up to proceed to the processing performed in Step S510. In this manner, in the present embodiment, in response to the reply (Step S512) to the instructions from the managed apparatus 102 (Step S519), the established session is maintained and further instructions can be executed. Therefore, the management server 106 can reliably execute high-level instructions to the managed apparatus 102 across the firewall. (Execution Results for Input Commands Illustrated in FIG. 6)

FIG. 10 is a view of configuration information produced as a result of executing five input commands shown in FIG. 6. The numerals 1217 through 1232 shown in FIG. 10 correspond to the numerals 1201 through 1216 shown in FIG. 8. However, because the installation location of Device A has been changed by commands 1101 and 1103 among the input commands shown in FIG. 6, as shown in 1221, the site where Device A is installed has been changed from Kawasaki Building 3rd Floor to Kawasaki Building 4th Floor, to Kawasaki Building 2nd Floor.

Moreover, the configuration information 1233 of Device D, which is shown with a broken line indicating that it was present here once, was later eliminated as a result of the device deletion command in 1105 shown in FIG. 6 and is no longer present here. The configuration information of Device E, which is listed in 1238 through 1242, refers to the device added in accordance with the addition command of 1104 shown in FIG. 6.

FIG. 10 corresponds to the managed apparatus configuration information 461 of the managed apparatus 102, which stores a record of the request status of FIG. 4B. The configuration information shown in FIG. 10 is obtained if the commands shown in FIG. 6 are reflected in the configuration information 1201 shown in FIG. 8. When the configuration information is updated simultaneously with receipt of commands from the Administrator, both in case of overwriting and deletion of the target monitored device, this is reflected only in the reconfiguration information 1217, such as the information shown in FIG. 10. The check box on the right-hand side of the reconfiguration information 1217 denotes a flag, and if the flag is set in a location corresponding to a reconfiguration, the difference can be efficiently extracted when calculating differential information in the subsequent Operating Example 2. However, the flag information does not represent information essential for extracting the difference.

<Operating Example 2 of Management Server of Present Embodiment>

Operating Example 2 of the management server 106 of the present embodiment will be explained based on the above-mentioned configuration. Operating Example 2 has the following characteristics. In different cases, the commands shown in FIG. 6 include commands that involve cancellation and commands providing instructions regarding overwriting. In such a case, when the management server 106 transmits commands addressed to the managed apparatus 102 as is, efficiency deteriorates and may cause failure as a result of communication traffic, processing of unnecessary commands, etc. Therefore, the management server 106, in terms of intra-server behavior, manages two kinds of configuration information. One is configuration information related to the target managed apparatus (see FIG. 8). Another one, which is reconfiguration information shown in 1217 in FIG. 10, is managed apparatus configuration information containing the request status (see FIG. 10). When the configuration information is updated simultaneously with receipt of commands from the Administrator, both in case of overwriting and deletion of the target device, only the reconfiguration information is reflected.

When the management server 106 receives the command request from the managed apparatus 102, the management server 106 issues commands based on the user request in accordance with the difference information between the configuration information 1201 shown in FIG. 8 and reconfiguration information 1217 shown in FIG. 10. The commands issued by the management server 106 based on this difference information are the two commands shown in FIG. 12. Command 1301 is an installation location update, i.e. attribute information for Device A, which is generated as a result of the final update, and command 1302 is a command used to register Device E as a new monitored device in the managed apparatus 102. In Operating Example 2, the management server 106, which received the command request from the managed apparatus 102, generates the two commands 1301 and 1302 shown in FIG. 12 and transmits them in succession to the managed apparatus 102.

(Exemplary Operating Procedure of Operating Example 2)

Figure 11A:
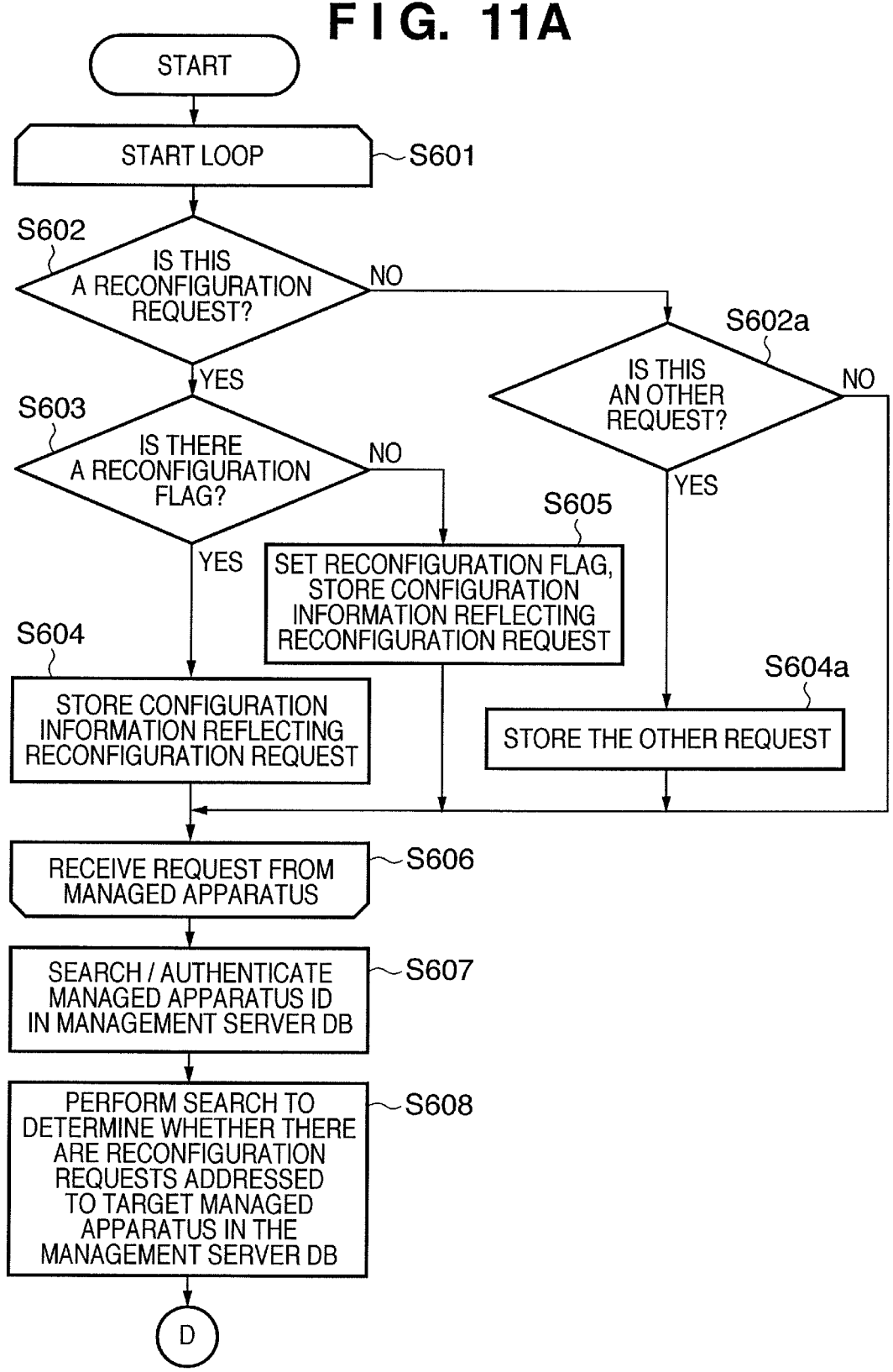
Figure 11B:
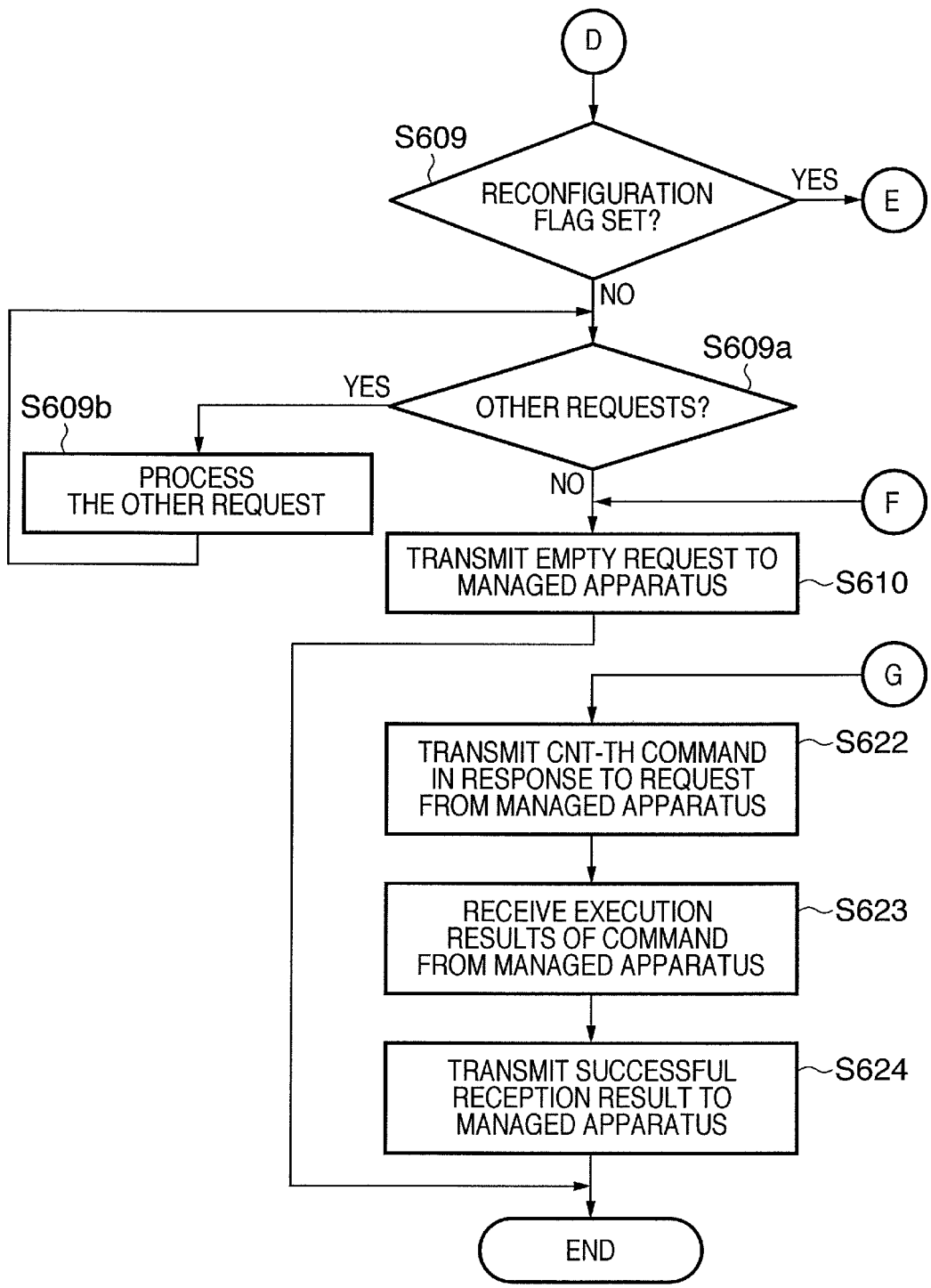

FIGS. 11A to 11C are flowcharts of processing wherein, the management server 106 receives a request from the Administrator and transmits a command to the managed apparatus 102. If a plurality of requests are received from the Administrator in the operating example of the flowcharts shown in FIGS. 11A to 1C, they are reflected in the managed apparatus configuration information 461 managed by the management server 106 and no record of the commands themselves is stored in the database. When the command request is received from the managed apparatus 102, the management server 106 requests configuration information from the managed apparatus 102 and performs a comparison between the managed apparatus configuration information 461 managed by the management server 106 and managed apparatus configuration information 462 received from the managed apparatus. Based on the difference information 463 resulting from the comparison between the managed apparatus configuration information 461 and managed apparatus configuration information 462, the management server 106 then produces commands to be issued to the managed apparatus 102. The optimized changed commands shown in FIG. 12 are produced based on the processing shown in the flowcharts of FIGS. 11A to 11C.

A loop is started in Step S601 for internal processing in the management server 106. In Step S602, the management server 106 receives a request from the Administrator through the user interface. Because generation of other requests from the Administrator, or absence of generation of requests, is possible here, the management server 106 makes a determination as to the request from the Administrator. Specifically, the management server 106 determines whether the request from the Administrator is a reconfiguration request and, if it is not the reconfiguration request, then, in Step S602a, it makes a determination as to whether it is an other request. If it is determined that the reconfiguration request has been received from the Administrator in Step S602, the process proceeds to Step S603. In Step S603 the management server 106 determines whether the request command is executed for the first time or there is a reconfiguration flag indicating that a similar request command has been received in the past. If it is determined that no reconfiguration flag has been set during determination processing in Step S603, the process proceeds to Step S605. In Step S605, the management server 106 sets a reconfiguration flag for the request and stores the configuration information of the target managed apparatus managed in the management server 106 in the database in accordance with the request.

If it is determined that the reconfiguration flag has already been set during determination processing in Step S603, the process proceeds to Step S604. In Step S604 the management server 106 reflects the configuration information of the target managed apparatus managed in the management server 106 in accordance with the request and once again stores thereof in the database.

On the other hand, if in Step S602 the request from the Administrator is not the reconfiguration request, then in Step S602a the management server 106 determines whether it is the other request (for instance, a configuration information request or reboot request, etc.). If the request from the Administrator is the other request, then in Step S604a the management server 106 stores the other request in the database.

It is noted that if the request was not received from the Administrator in Step S602, the process proceeds to Step S606. In Step S606, the loop ends. As for the conditions of loop ends, the processing of the loop comes to an end upon receipt of the command request from the managed apparatus 102. In addition, if the command request is received from the managed apparatus 102 in Step S606, then a session is established in the same manner as in Sequence S405.

In Step S607 the management server 106 searches the database for the managed apparatus ID and authenticates the managed apparatus. In Step S608, the management server 106 performs a search to determine whether commands (reconfiguration requests) addressed to the target managed apparatus is stored in the database. In Step S609, the management server 106 determines whether the reconfiguration flag has been set. If according to the determination made in Step S609 no reconfiguration flags have been set, then, in Step S609a, the management server 106 determines whether there are other requests. If there are other requests, the management server 106 processes the other requests in Step S609b. When there are no other requests or the processing of the other requests is over, in Step S610, the management server 106 transmits an empty command request to the managed apparatus 102 and terminates processing.

If according to the determination made in Step S609 the reconfiguration flag has been set, then, in Step S611, the management server 106 issues a request for current configuration information to the managed apparatus 102 and receives the configuration information of the managed apparatus 102. In Step S612, the management server 106 performs a comparison between the current managed apparatus configuration information 462 (which corresponds to FIG. 8 in the present embodiment) received from the managed apparatus 102 and managed apparatus configuration information 461 (which corresponds to FIG. 10 in the present embodiment), which reflects the requests from the Administrator. In Step S613, the management server 106 makes a determination as to the results of the comparison of Step S612 (whether there is the difference in terms of managed apparatus configuration information). If in Step S613 there is no difference in terms of the respective managed apparatus configuration information, the process proceeds to Step S610. If in Step S613 there is the difference in terms of the respective managed apparatus configuration information, the process proceeds to Step S614.

In Step S614, the management server 106 issues M commands addressed to the managed apparatus 102 based on the difference outputted based on the comparison of the managed apparatus configuration information. In the present embodiment, as shown in FIG. 10, changes in the managed apparatus configuration information consist in changing the location of installation of Device A (1221) and the addition of Device E (1238 through 1242). As a result, two commands, i.e. 1301 and 1302, which are shown in FIG. 12, are issued (M=2). In Step S615, the management server 106 resets the value of the counter CNT and sets it to CNT=1. In Step S616, the management server 106 compares the value of the counter CNT and the number M of the commands. If the value of the counter CNT is less than the number M of commands, then in Step S617 the management server 106 transmits the CNT-th command to the managed apparatus 102 (in response to a request therefrom). In Step S618, the management server 106 receives the execution result of the command transmitted to the managed apparatus 102 in Step S617. In Step S619, for the next command, the management server 106 transmits a requisition for a command request (request requisition) to the managed apparatus 102. In Step S620, the management server 106 receives a command request from the managed apparatus 102 as a result of the instruction of Step S619. In Step S621, the management server 106 increments the value of the counter CNT by one.

If in Step S616 the value of the counter CNT reaches the number M of commands, then in Step S622 the management server 106 transmits the CNT-th (M-th) command to the managed apparatus 102 (in response to a request therefrom). In Step S623, the management server 106 receives the result of the command transmitted to the managed apparatus 102 in Step S622 (execution result of command by the managed apparatus 102). In Step S624, the management server 106 transmits the result of successful communication (successful reception) in Step S623 to the managed apparatus 102. The session that has been maintained is then terminated by the management server 106 on its own or as a result of a time-out.
(Exemplary Commands Generated and Transmitted in Operating Example 2)

FIG. 12 is a view of exemplary commands generated and transmitted in accordance with the flowchart shown in FIGS. 11A to 11C (Operating Example 2). Referring to FIG. 12, the five input commands shown in FIG. 6 are turned into two commands produced by deleting the results of duplication, deletions, etc. 1301 is an installation location update command, i.e. attribute information for Device A, which is generated as a result of the final update, and command 1302 is a command used to register Device E as a new monitored device in the managed apparatus 102. It is noted that the commands 1301 and 1302 shown in FIG. 12 are left intact and are executed in the following Operating Example 3 as well.
(Exemplary Operating Sequence of Operating Example 2)

Figure 13A:
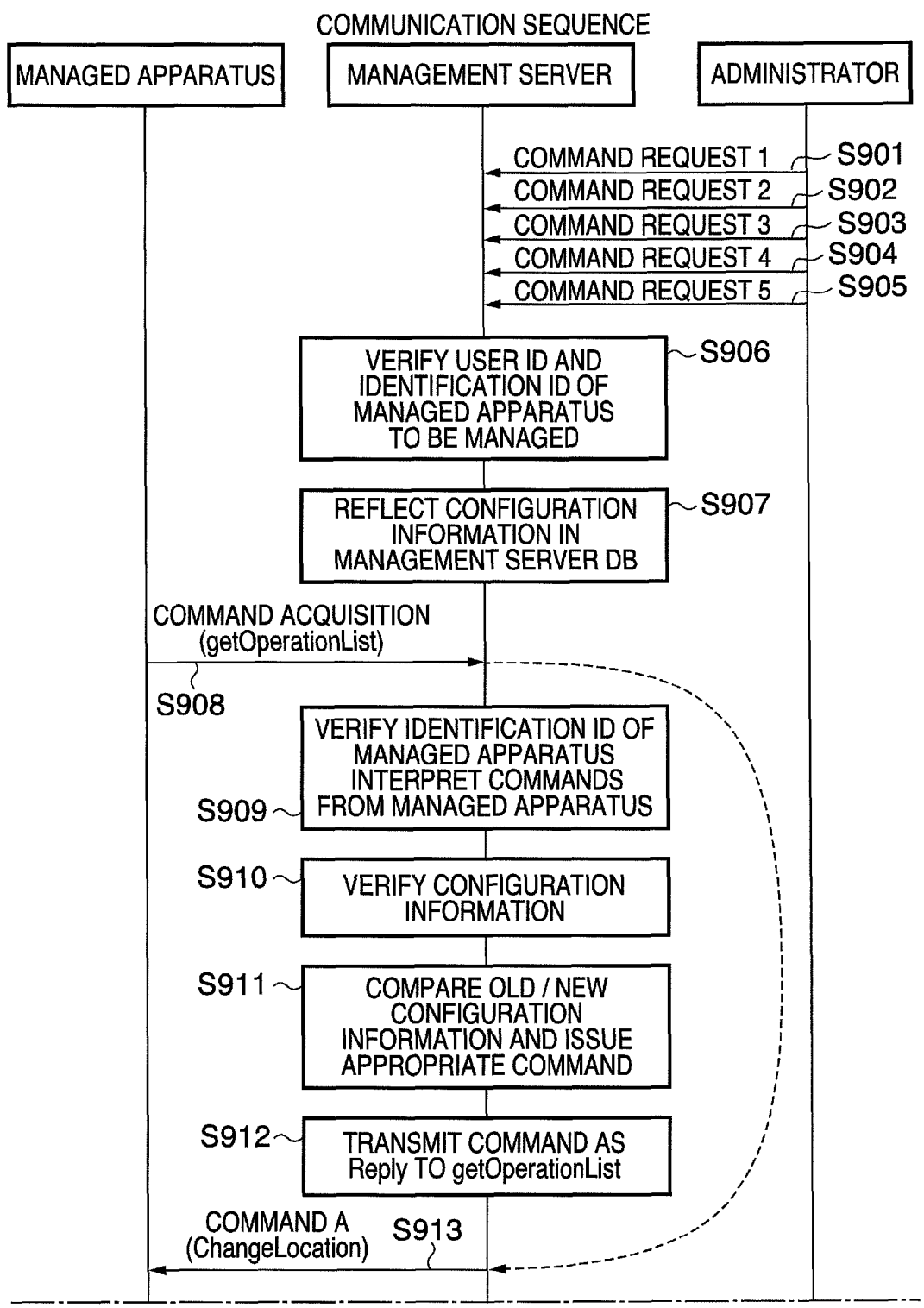
FIGS. 13A and 13B are example views of a communication sequence used between the managed apparatus, the management server, and the Administrator in Operating Example 2.
Figure 13B:
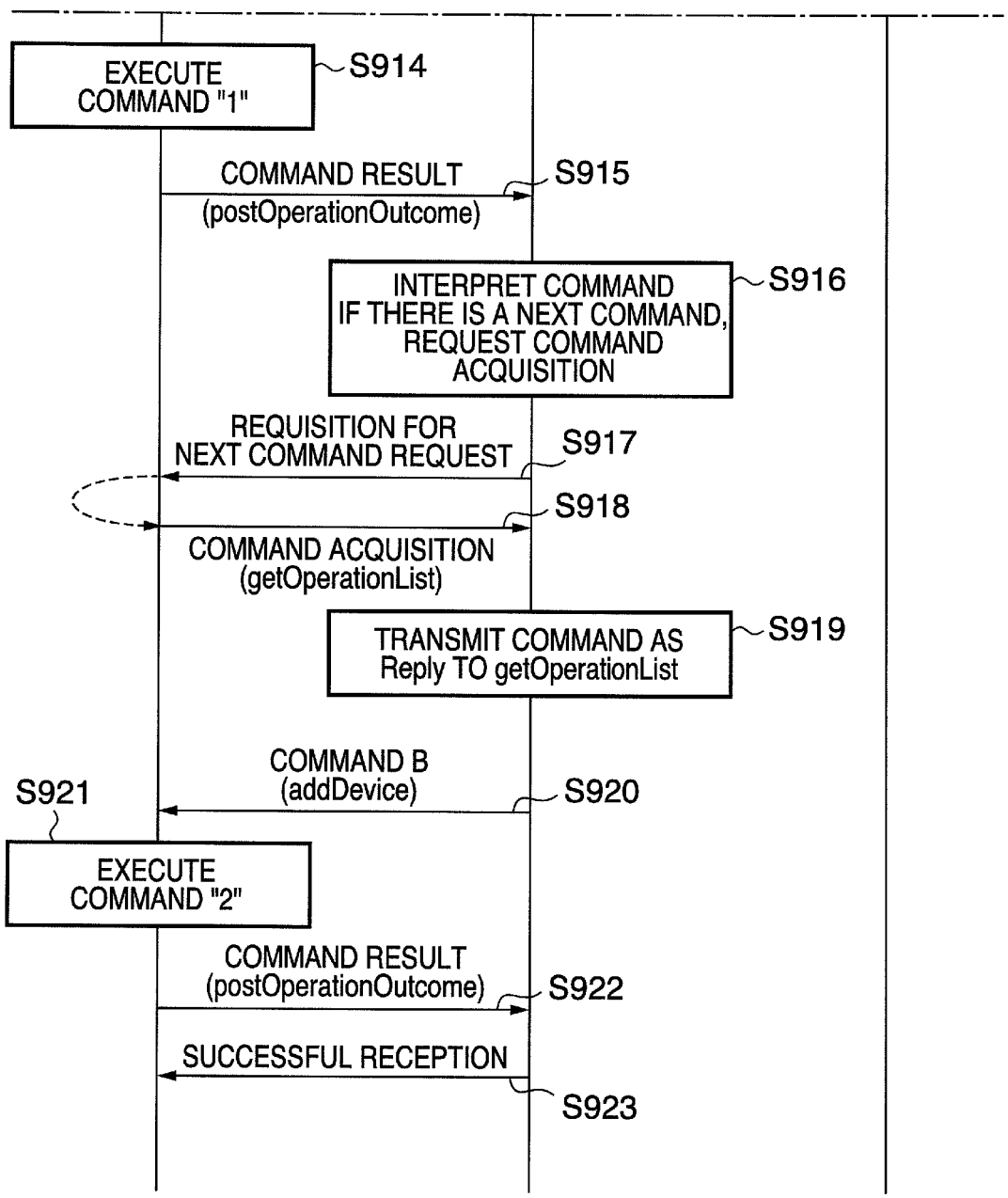

FIGS. 13A and 13B are views providing a detailed illustration of a part of the communication sequence of Operating Example 2 used between the managed apparatus 102, the management server 106, and the Administrator. In the present embodiment, the plurality of commands entered by the Administrator are accumulated as the difference information of the configuration information of the managed apparatus 102. When a command request is received from the managed apparatus 102, new optimized commands are generated based on the configuration difference information and the multiple generated commands are transmitted to the managed apparatus 102. Specifically, two kinds of managed apparatus configuration information are managed in the management server. One is configuration information for the managed apparatus 102 operating at the moment and another is configuration information for the new managed apparatus 102, in which the commands from the Administrator are reflected. Whenever a new instruction is entered by the Administrator, the configuration information reflecting the commands is updated and, when a command request is received from the managed apparatus 102, the management server 106 automatically issues commands based on the difference between the two kinds of configuration information. The management server 106 then transmits the plurality of issued commands to the managed apparatus 102.

Sequences S901, S902, S903, S904 and S905 show the Administrator entering respective commands of various meanings via the management server 106. In Sequence S906, using the Administrator's user ID provided during login, the management server 106, based on database access control, makes a determination as to whether the Administrator performing the operations has the right to issue commands addressed to the target managed apparatus 102 (managed apparatus identification ID). In other words, the management server 106 verifies the user ID and identification ID of the managed apparatus. In Sequence S907, the management server 106 directly reflects the commands issued by the Administrator in the configuration information managed in the management server 106. At such time, the management server 106 manages two kinds of configuration information, i.e. the original configuration information of the managed apparatus 102 and the changed configuration information of the managed apparatus 102. The purpose of doing so is to extract differences from the two kinds of configuration information when issuing commands. The management server 106, however, does not necessarily have to manage two kinds of configuration information and, in practice, it may receive the current configuration from the managed apparatus without managing two kinds of configuration information. Here, it is not specified where the configuration information is managed.

Sequence S908 represents a command request (command acquisition) from the target managed apparatus 102. This command request is a command whereby an inquiry is made as to the presence/absence of commands addressed to the managed apparatus 102. When the managed apparatus 102 transmits the command request in Sequence S908, a communication session is initiated by the managed apparatus 102 on its own. Moreover, as a result of establishment of the communication session based on the managed apparatus 102 initiating access to the management server 106 on its own, the management server 106 is enabled to execute various instructions with respect to the managed apparatus 102 across the firewall protecting the managed apparatus 102. In Sequence S909, the management server 106 prepares a response to the command request from the managed apparatus 102 in Sequence S908. Specifically, the management server 106 recognizes the managed apparatus ID (identification ID) transmitted along with the command request and searches for the managed apparatus ID in the database of the management server. Based on the results of the search, the management server 106 verifies whether this is a legitimate managed apparatus and verifies the type of the received data (interprets the commands from the managed apparatus 102). Because the command received from the managed apparatus 102 is the command request (getOperationList), in Sequence S910, the management server 106 verifies whether there is update information for the configuration information of the target managed apparatus. If there is update information for the configuration information, in Sequence S911, the management server 106 compares the original configuration information (old configuration information) with the updated configuration information (new configuration information) and issues appropriate commands based on the difference. In Sequence S912, the management server 106 transmits a command to the managed apparatus 102 as a Reply to the command request (getOperationList) of Sequence S908. The command used herein is a command intended for configuration information acquisition from the managed apparatus 102.

Sequence S913 represents a Reply communication from the management server 106 to the managed apparatus 102. In Sequence S914, the managed apparatus 102 executes the command (command "1") received from the management server 106. Sequence S915 represents the transmission of the result of the command executed in Sequence S914 to the management server 106. In Sequence S916, the management server 106 again performs authentication of the managed apparatus 102 and performs command verification (interpretation). The command from the managed apparatus 102 includes the result of the previous command. In addition, if there are remaining commands addressed to the managed apparatus 102, the management server 106 issues instructions to the managed apparatus 102 to generate a command request (getOperationList).

Sequence S917 shows the next command request (getOperationList). It is noted that information indicating that the reception of the previous command has been successful is also included in the command request of Sequence S917. Sequence S918 represents a command request (command acquisition) from the target managed apparatus 102 in response to the request from the management server 106. In Sequence S919, the management server 106 transmits a command to the managed apparatus 102 as a Reply to the command request (getOperationList) of Sequence S918.

Sequence S920 represents a command transmitted by the management server to the managed apparatus 102 as a Reply to the command request (getOperationList). In Sequence S921, the managed apparatus 102 executes the received command (command "2"). Sequence S922 represents the transmission of the result of the command executed in Sequence S921 to the management server 106. In Sequence S923, the management server 106 informs the managed apparatus 102 of the problem-free reception (successful reception) of the communication of Sequence S922. It is noted that because the management server 106 does not have a next command to transmit to the managed apparatus 102, a Reply is returned without requesting a next command. The session that has been maintained is then terminated by the management server 106 on its own or as a result of a time-out.

<Operating Example 3 of Management Server of Present Embodiment>

Operating Example 3 of the management server 106 of the present embodiment will be explained based on the above-mentioned configuration.

(Exemplary Operating Procedure of Operating Example 3)

Figure 14A:
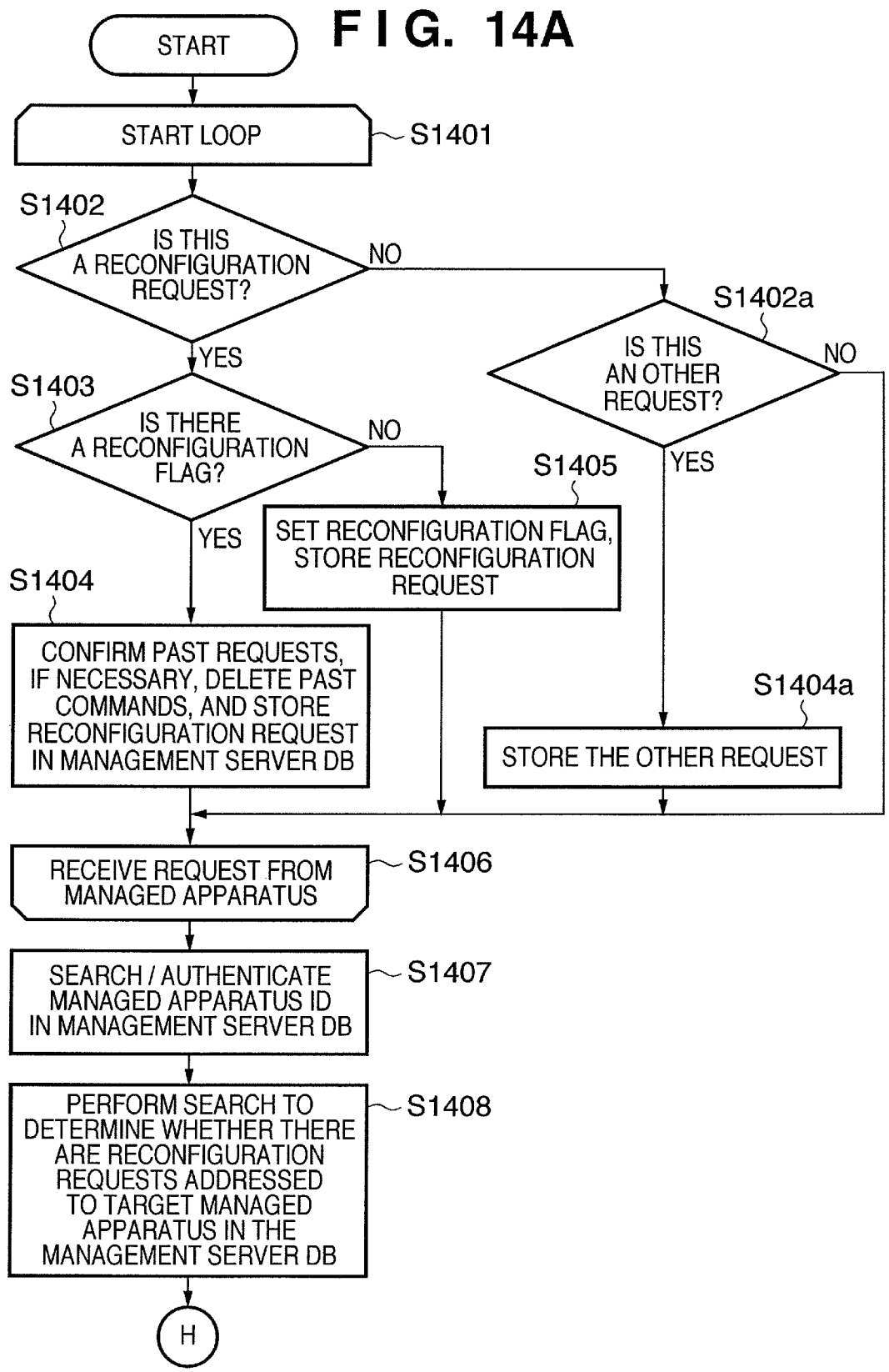
FIGS. 14A to 14C are flowcharts showing example processing wherein, in Operating Example 3, the management server receives a request and transmits a command to the managed apparatus.
Figure 14B:
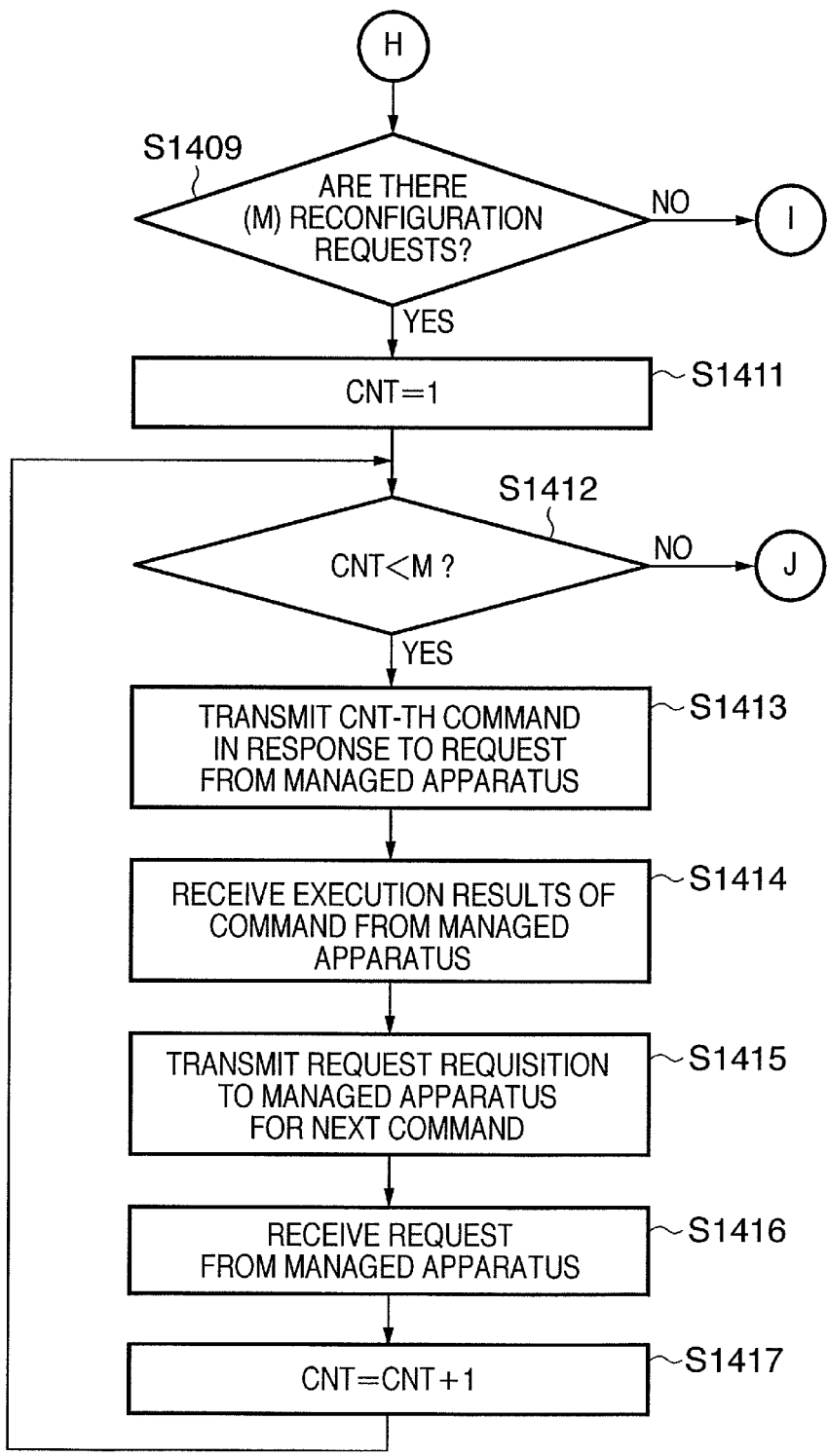
Figure 14C:
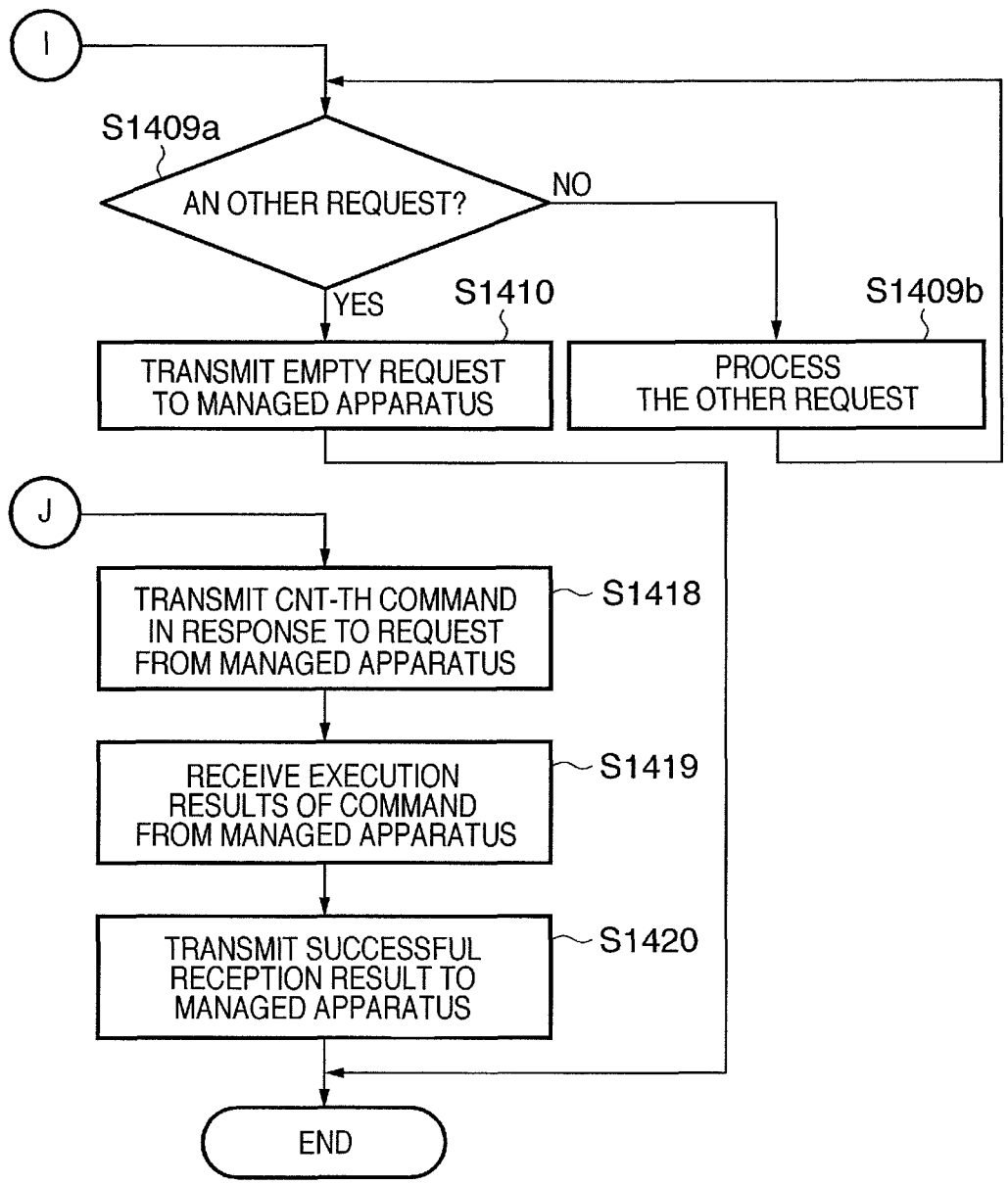

FIGS. 14A to 14C are flowcharts of another embodiment, wherein the management server 106 performs optimization of commands transmitted to the managed apparatus 102. If a plurality of requests are received from the Administrator in the operating example of the flowcharts shown in FIGS. 14A to 14C, the commands is stored in a command queue of the management server 106. After that, whenever a command is received, the management server 106 verifies if there are commands that affect one another, and constantly performs optimization to manage the command queue. It is noted that, in the Operating Example 3, in the same manner as in Operating Example 2, the optimized commands are reduced in number to the two commands shown in FIG. 12. Although Operating Example 3 does not differ from Operating Example 2 in optimizing and transmitting the plurality of instructions entered by the Administrator to the managed apparatus 102, it is different in terms of the method used for generating appropriate commands. In FIGS. 11A to 1C, the management server 106 generated a plurality of appropriately changed commands is generated by extracting the difference between the configuration information of the management server 106 and the configuration information of the managed apparatus 102 managed by the management server 106. On the other hand, in FIGS. 14A to 14C, the management server 106 verifies the commands entered in the past in the command queue and optimizes commands that affect one another every time the Administrator inputs an instruction. In other words, in Operating Example 3, when a new command is entered, optimized commands are readied for the command queue in real time and the system waits for a command request from the managed apparatus 102.

A loop is started in Step S1401 for internal processing in the management server 106. In Step S1402, the management server 106 receives a request from the Administrator through the user interface. Because generation of other requests from the Administrator, or absence of generation of requests, is possible here, the management server 106 makes a determination as to the request from the Administrator. Specifically, the management server 106 determines whether the request from the Administrator is a reconfiguration request and, if it is not the reconfiguration request, then, in Step S1402a, it makes a determination as to whether it is an other request. If it is determined that the reconfiguration request has been received from the Administrator in Step S1402, the process proceeds to Step S1403. In Step S1403, the management server 106 determines whether the reconfiguration request command is executed for the first time or there is a reconfiguration flag indicating that a similar reconfiguration request has been received in the past. If it is determined that no reconfiguration flag has been set during determination processing in Step S1403, the process proceeds to Step S1405. In Step 1405, the management server 106 sets a reconfiguration flag for the request and stores the request in the command queue managed in the management server 106. If it is determined that the reconfiguration flag has already been set during determination processing in Step S1403, the process proceeds to Step S1404.

In Step S1404, the management server 106 performs a comparison between the commands in the command queue and the newly issued commands and stores the new request in the command queue based on the results of the comparison. Specifically, if there are no commands that affect one another between the commands in the command queue and the newly issued commands, the management server 106 stores the new request in the command queue. If there are commands that affect one another between the commands in the command queue and the newly issued commands, the management server 106 performs deletion of commands from the command queue and other appropriate processing and stores the new request in the command queue. Here, the number of commands entered by the Administrator is denoted as N and the number of commands of the new request is denoted as M.

On the other hand, if in Step S1402 the request from the Administrator is not the reconfiguration request, then in Step S1402*a* the management server 106 determines whether it is the other request (for instance, a configuration information request or reboot request, etc.). If the request from the Administrator is the other request, then in Step S1404*a* the management server 106 stores the other request.

It is noted that if the request was not received from the Administrator in Step S1402, the process proceeds to Step S1406. In Step S1406, the loop ends. As for the conditions of loop ends, the processing of the loop comes to an end upon receipt of a command request from the managed apparatus 102.

In Step S1407, the management server 106 searches the database for the managed apparatus ID and authenticates the managed apparatus. In Step S1408, the management server 106 performs a search to determine whether the commands (reconfiguration requests) addressed to the target managed apparatus is stored in the database. In Step S1409, the management server 106 determines whether there are reconfiguration requests in the request queue. If it is determined that no reconfiguration request has been made during determination processing in Step S1409, the process proceeds to Step S1409*a*. In Step S1409*a*, the management server 106 determines whether there are other requests. If there are other requests, the management server 106 processes the other requests in Step S1409*b*. When there are no other requests or the processing of the other requests is over, in Step S1410, the management server 106 transmits an empty command request to the managed apparatus 102 and terminates processing.

If it is determined that the reconfiguration request has been made during determination processing in Step S1409, the process proceeds to Step S1411. In Step S1411, the management server 106 resets the value of the counter CNT and sets it to CNT=1. In Step S1412, the management server 106 compares the value of the counter CNT and the number M of the commands. If the value of the counter CNT is less than the number M of commands, then in Step S1413 the management server 106 transmits the CNT-th command to the managed apparatus 102 (in response to a request therefrom). In Step S1414, the management server 106 receives the execution result of the command transmitted to the managed apparatus 102 in Step S1413. In Step S1415, for the next command, the management server 106 transmits a requisition for a command request (request requisition) to the managed apparatus 102. In Step S1416, the management server 106 receives a command request from the managed apparatus 102 as a result of the instruction of Step S1415. In Step S1417, the management server 106 increments the value of the counter CNT by one.

If in Step S1412 the value of the counter CNT reaches the number M of commands, then in Step S1418 the management server 106 transmits the CNT-th (M-th) command to the managed apparatus 102 (in response to a request therefrom).

In Step S1419, the management server 106 receives the result of the command transmitted to the managed apparatus 102 in Step S1418 (execution result of command). In Step S1420, the management server 106 transmits the result of successful communication (successful reception) in Step S1419 to the managed apparatus 102.

<Exemplary Configuration of Managed Apparatus of Present Embodiment>
(Exemplary Hardware Configuration of Managed Apparatus)

Figure 15:
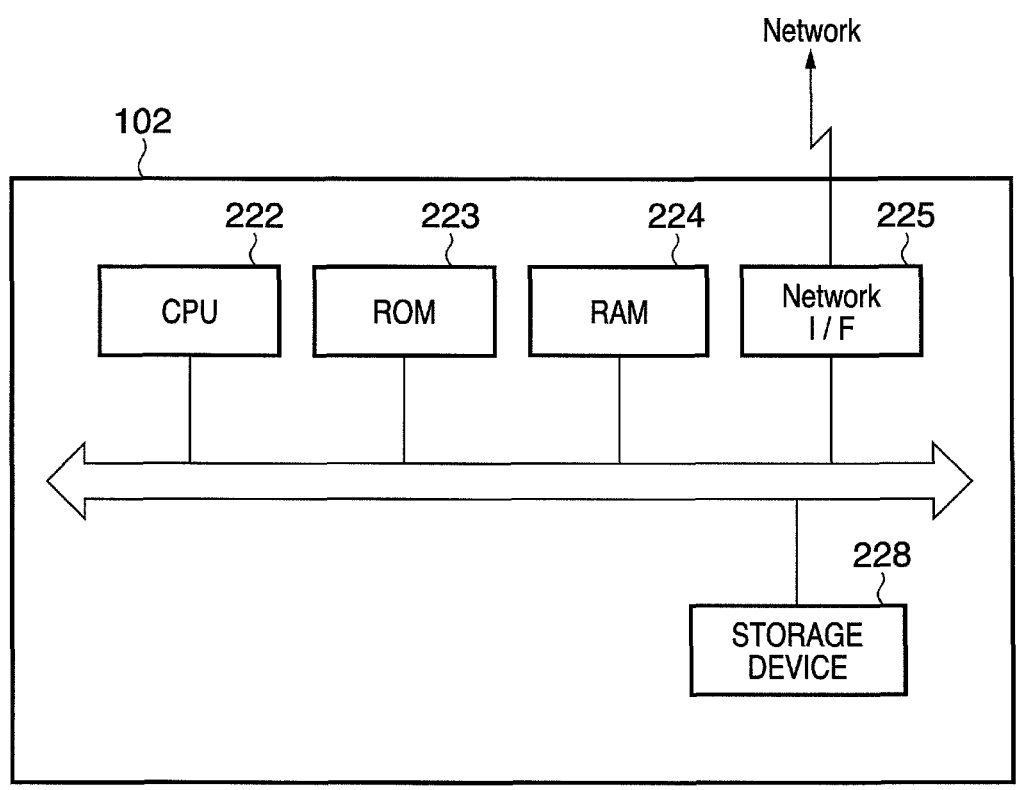
FIG. 15 is a block diagram of an exemplary hardware configuration of the managed apparatus according to the present embodiment.

FIG. 15 is a view of the hardware configuration of the managed apparatus 102 according to the present embodiment. FIG. 15 shows the configuration of an standalone managed apparatus 102 used for device management as shown in FIG. 1, but here the managed apparatus 102 may be installed on a client PC 103 or copy machine 101 and, in such a case, constituent elements used for processing the respective devices are added thereto.

The managed apparatus 102 may be constituted by a general-purpose computer, etc. The managed apparatus 102 includes a CPU 222 used for overall control. Moreover, the managed apparatus 102 includes a ROM 223 serving as a read-only memory for storing a boot program required for system startup and a RAM 224 serving as a working memory required when executing programs in the CPU 222. Furthermore, the managed apparatus 102 includes a network interface (I/F) 225 used for conducting communication on the network and a storage device 228, such as a magnetic disk, etc., which stores the operating information etc. sent from the copy machines and programs executed in the CPU 222.

The managed apparatus 102, periodically or in response to requests from the management server 106, transmits periodically operating information notifications, non-periodically fault condition notifications, and command requests to the management server 106 through the network interface I/F 225. The periodically communicated operating information includes various counter values and operation logs, etc. In addition, information on the extent of wear of parts used in the copy machine 101 relative to their recommended useful life is transmitted in report form by the managed apparatus 102. In addition to the operating information, the non-periodically communicated information indicating fault conditions in the copy machine 101 contains error/alarm information on various hardware failures, jamming, etc. that may occur.

(Exemplary Storage Configuration of Managed Apparatus)

Figure 16:
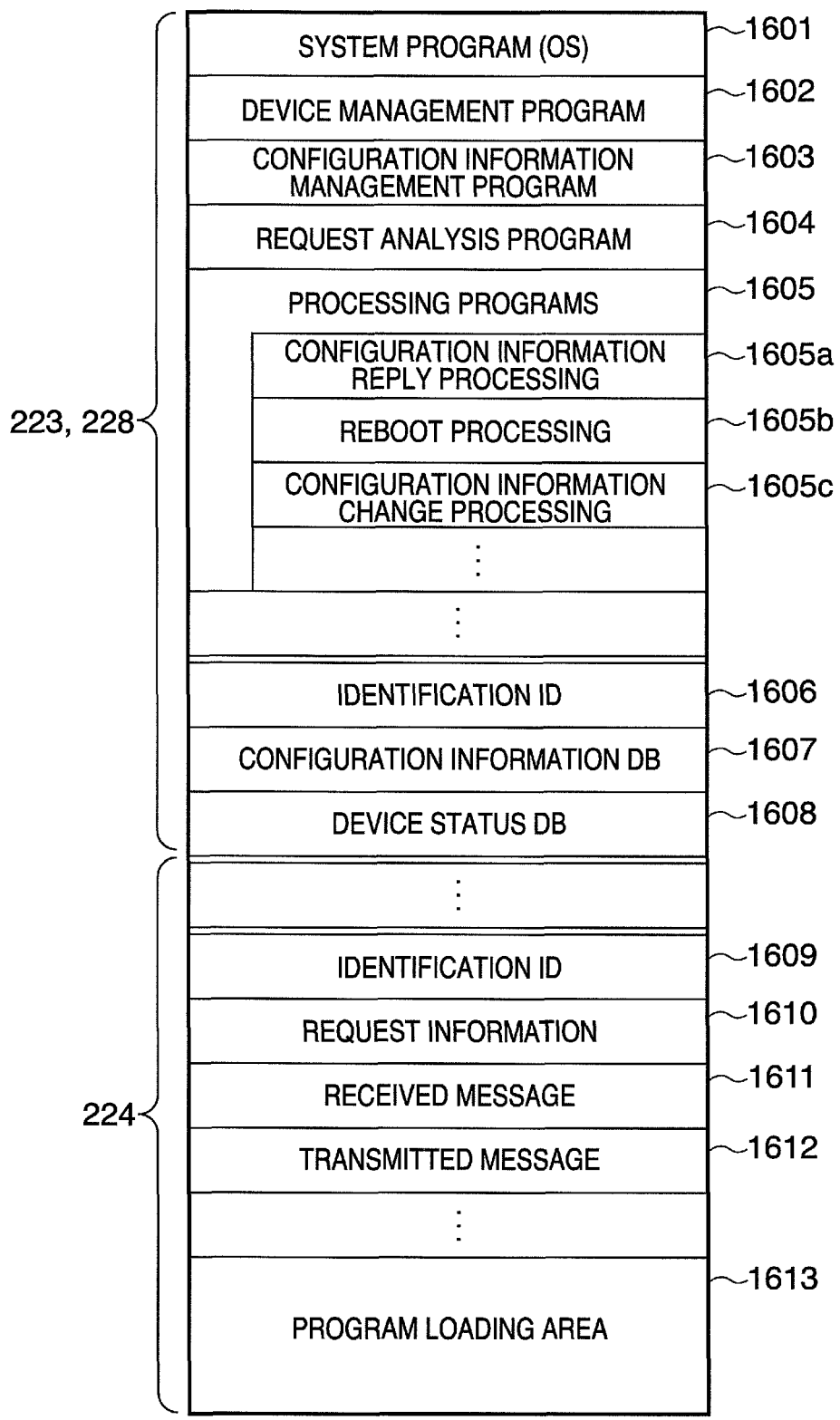
FIG. 16 is a view of an exemplary storage configuration of the managed apparatus according to the present embodiment.

FIG. 16 is a view of the configuration of programs and data nonvolatile-stored in the storage device 228 or ROM 223 shown in FIG. 15 and the configuration of data temporarily stored in the RAM 224. It is noted that FIG. 16 shows only the program and data associated with the present embodiment, with other programs and data omitted.

In FIG. 16, the numeral 1601 denotes system program (OS) exercising basic control over the device. The numeral 1602 denotes a device management program exercising overall control over device management of the managed apparatus 102. The part of the device management program 1602 related to the present embodiment will be explained in detail below with reference to FIG. 18. The numeral 1603 denotes a configuration information management program managing device configuration information. The numeral 1604 denotes a request analysis program analyzing requests contained in messages received from the management server 106 and issuing instructions regarding execution of the corresponding processing. The numeral 1605 denotes various processing programs executed in accordance with the analytical results of the request analysis program 1604. If the analytical result of the request analysis program is a configuration information request, the processing programs 1605 execute configuration information reply processing 1605*a*. Moreover, if the analytical result of the request analysis program is a reboot request, the processing programs 1605 execute reboot processing 1605*b*. In addition, if the analytical result of the request analysis program is a configuration information change request, the processing programs 1605 execute configuration information change processing 1605c. It is noted that while the description provided here relates to received requests associated with the present embodiment, the invention is not limited thereto.

The numeral 1606 denotes the identification ID of the management server 106. The numeral 1607 denotes a configuration information database (DB) for devices managed by the managed apparatus 102. The numeral 1608 denotes a status database (DB) for devices managed by the managed apparatus 102, stored in association with the configuration information DB.

The numeral 1609 denotes an identification ID contained in the message received from the management server 106. The numeral 1610 denotes request information contained in the message received from the management server 106. The numeral 1611 denotes a received message received from the management server 106. The numeral 1612 denotes a transmitted message transmitted to the management server 106. The numeral 1613 denotes a program loading area, where the CPU 222 carries out loading for executing programs.

(Exemplary Configuration of Communication Data from Managed Apparatus)

FIG. 17 is a schematically view of commands and data transmitted from the managed apparatus 102 to the management server 106. The commands and data shown in FIG. 17 correspond to the transmitted message 1612 shown in FIG. 16.

In FIG. 17, the numeral 701 denotes the time and date of data transmission, and refers to internal time in the managed apparatus 102 at the start of data transmission from the managed apparatus 102 to the management server 106. The type of communication, 702, is an identifier specifying whether this communication is periodic or nonperiodic. The numeral 703 denotes managed apparatus information. Information used for identifying the managed apparatus types and information used for uniquely identifying managed apparatuses in the management server are outputted in the managed apparatus information 703. A managed apparatus ID, which is the identification ID of the managed apparatus 102, is outputted in 704. A managed apparatus Type, which is the type of the managed apparatus 102, is outputted in 705. The managed apparatus Type is a code representing various types, such as whether the managed apparatus 102 is a monitoring program running on a copy machine, whether it is a program running on a PC, or whether it is a monitoring device operating on a special device, etc. A managed apparatus Version, which is the version associated with the program of the managed apparatus 102, is outputted in 706. Command information is outputted in 707.

In the present embodiment, a command request is outputted in 707. The command request is a command requesting command information, records of which are stored on the management server. Moreover, a configuration requisition is outputted in 708. The configuration requisition is a command requesting the configuration information of the management server when resetting all the managed apparatuses. Moreover, in 709, a command is issued that communicates the configuration information of the managed apparatus 102 and data is transmitted to the management server 106 along with the command. In 710, an access URL, which is a URL accessed by the managed apparatus 102, is outputted in 710. Communication schedule information, i.e. a communication schedule set up in the managed apparatus 102, is outputted in 711. A list of devices managed by the managed apparatus 102 is outputted in 712. The numerals 713 through 715 denote information on the devices managed by the managed apparatus 102 (in the present embodiment, Devices A through C).

<Example of Operation of Managed Apparatus of Present Embodiment>
(Exemplary Operating Procedure of Managed Apparatus)

Figure 18:
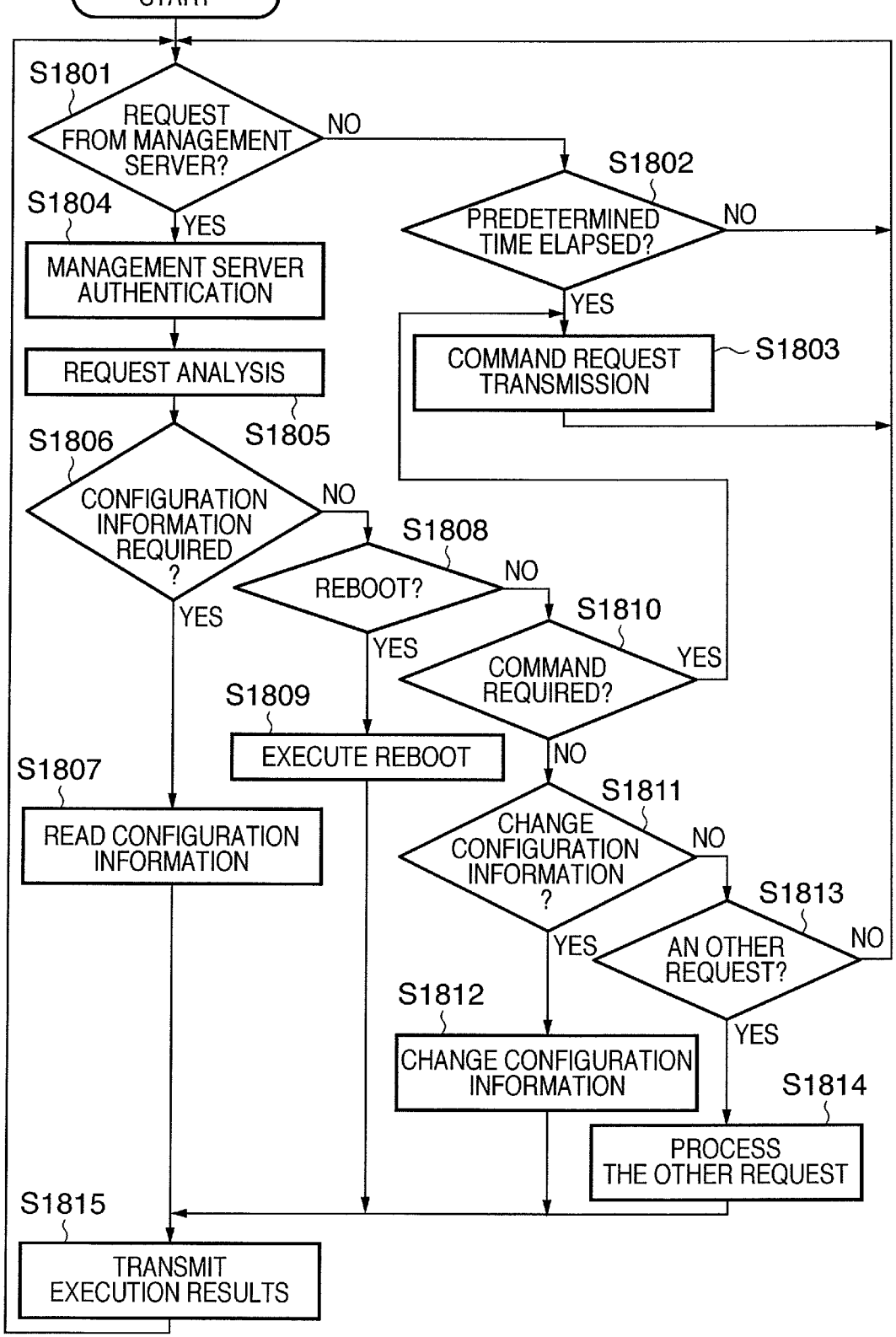
FIG. 18 is a flowchart showing an example operation of the managed apparatus according to the present embodiment.

FIG. 18 is a flowchart of the operating procedure of the managed apparatus 102 according to the present embodiment. First, in Step S1801, the managed apparatus 102 determines whether a request from the management server 106 has been received. In other words, the managed apparatus 102 waits until the request from the management server 106 is received. If no request from the management server 106 is received, then, in Step S1802, the managed apparatus 102 makes a determination as to whether the time spent waiting without a request from the management server 106 has elapsed a predetermined time. If it is determined that the time spent waiting without a request from the management server 106 has elapsed the predetermined time, then, in Step S1803, the managed apparatus 102 transmits a command request to the management server 106.

On the other hand, if in Step S1801 it is determined that the request has been received from the management server 106, then in Step S1804 the managed apparatus 102 authenticates that the identification ID belongs to the management server 106 that manages it (authentication of the management server 106). Next, in Step S1805, the managed apparatus 102 analyzes the contents of the request received from the management server 106. In accordance with the results of the analysis of Step S1805, the managed apparatus 102 branches processing to Step S1806, Step S1808, Step S1811, and Step S1813 and executes the respective processing.

If the analytical result of Step S1805 is a command with a configuration information requisition (Step S1806), then in Step S1807 the managed apparatus 102 reads the configuration information from the configuration information DB 1607. Furthermore, in Step S1815, the managed apparatus 102 transmits the configuration information read in Step S1807 to the management server 106 as the execution result.

If the analytical result of Step S1805 is a reboot command (Step S1808), then the managed apparatus 102 performs a reboot in Step S1809. Furthermore, in Step S1815, the managed apparatus 102 transmits the reboot processing results to the management server 106 as the execution result.

If the analytical result of Step S1805 is a command for command request requisition (Step S1810), then, in Step S1803, the managed apparatus 102 transmits a command request to the management server 106.

If the analytical result of Step S1805 is a command to execute configuration information change (Step S1811), then in Step S1812, the managed apparatus 102 modifies the configuration information of the configuration information DB 1607. Furthermore, in Step S1815, the managed apparatus 102 transmits the results of change of Step S1812 to the management server 106 as the execution result.

If the analytical result of Step S1805 is a command containing an other request (Step S1813), then the managed apparatus 102 processes the other request in Step S1814. Furthermore, in Step S1815, the managed apparatus 102 transmits the results of processing of Step S1814 to the management server 106 as the execution result.

It is noted that that in the present embodiment explanations cite an example of a communication sequence between a management server and a single managed apparatus. However, when the stored input commands relate to a plurality of managed apparatuses, control may be exercised in the following manner. For instance, in Sequence S414 shown in FIG. 2B, the management server exercises control such that a response regarding successful reception is issued to the managed apparatus to which it returned a Reply to the previous request, and a requisition for a command request is transmitted to the other managed apparatus targeted by the subsequent input command.

Moreover, while the explanations used a standalone apparatus independent from a device such as a copy machine as an example of the managed apparatus 102, the functionality of the managed apparatus 102 can be built into the client PC 103 or copy machine 101.

Moreover, although the numerical reduction of the instructions from the Administrator in the present embodiment was explained only with respect to device reconfiguration, the invention is not limited thereto, and, Administrator instructions generated when there are no command requests from the managed apparatus can be subjected to a reduction in case of other requests as well.

In addition, an aspect of the present invention to provide the system or apparatus with a storage medium storing software program code implementing the functionality of the above-mentioned embodiments. Needless to say, it is then achieved by reading and executing the program code stored on the storage medium by the computer (or CPU, MPU) of the apparatus or system. In such a case, the program code read from the storage medium itself implements the functionality of the above-mentioned embodiments and therefore the program code itself and the storage medium, on which the program code is stored, form part of the present invention.

The storage media used to supply the program code can utilize, for example, flexible disks, hard disks, optical disks, magneto-optical disks, CD-ROMs, CD-Rs, magnetic tape, nonvolatile memory cards, ROM, etc.

Moreover, the functionality of the above-mentioned embodiments is implemented not only by executing program code read by a computer. Needless to say, the invention also includes cases, in which the functionality of the above-mentioned embodiments is implemented when an OS etc. running on a computer partially or entirely carries out actual processing based on the instructions of the program code.

Furthermore, in addition, needless to say, the invention also includes cases, in which the program code read from the storage media is written to memory provided in an expansion board inserted in a computer or an expansion unit connected to a computer, and a CPU, etc. provided in the expansion board or expansion unit partially or entirely executes actual processing based on instructions of the program code and the functionality of the above-described embodiments is implemented based on such processing.

While the present invention has been described with reference to exemplary embodiments, it is to be understood that the invention is not limited to the disclosed exemplary embodiments. The scope of the following claims is to be accorded the broadest interpretation so as to encompass all such changes and equivalent structures and functions.

This application claims the benefit of Japanese Patent Application No. 2006-165374, filed on Jun. 14, 2006, which is hereby incorporated by reference herein in its entirety.

What is claimed is:

1. A management apparatus connectable, through a network, to a managed device located in a network environment utilizing a firewall to disallow spontaneous access through the network from outside the network environment, the management apparatus comprising:
   an input unit configured to enter an instruction addressed to the managed device, wherein the entered instruction includes at least one of an instruction to add a new network device to be monitored and an instruction to delete a monitored network device;
   a determination unit configured to, in response to a new instruction entered through the input unit, determine whether there is already stored an instruction to change or delete information on the managed device related to the new instruction;
   an instruction deletion unit configured to, in response to the new instruction entered through the input unit, delete the already stored instruction to change or delete the information based on a determination result by the determination unit;
   an instruction storage unit configured to store the new instruction entered through the input unit after the deletion of the already stored instruction by the instruction deletion unit; and
   an instruction reply unit configured to receive a query from the managed device, using a secure communication path, through the firewall as to the presence/absence of the entered instruction and, when an instruction stored in the instruction storage unit without being deleted by the instruction deletion unit is present, reply with the entered instruction in response to the query in the course of a session established when the query is received,
   wherein the query is a request command for periodically requesting the instruction stored in the instruction storage unit and includes type and version information of the managed device.

2. The management apparatus according to claim 1, wherein the instruction reply unit requests the query as to the presence/absence of instructions for the managed device and subsequently executes another instruction entered in response to the query by the managed device as to the presence/absence of instructions corresponding to the request.

3. The management apparatus according to claim 1, wherein the instruction reply unit includes:
   a counter configured to count the number of instructions returned in response to the query; and
   a reply controller configured to issue a reply with a single instruction in response to the query and a request for a query as to the presence/absence of the instruction until the count of the counter reaches the number of instructions stored in the instruction storage unit.

4. The management apparatus according to claim 1, further comprising an instruction change unit configured to, along with implementing a plurality of instructions entered via the input unit, change the plurality of instructions to instructions, whose number is smaller than the number of the plurality of instructions,
   wherein the instruction reply unit returns the instructions changed by the instruction change unit.

5. The management apparatus according to claim 4, wherein the instruction change unit includes:
   a difference recognition unit configured to recognize a difference between information of the managed device changed based on the plurality of instructions and information of the managed device held prior to the plurality of instructions; and
   an instruction generation unit configured to generate instructions whose number is smaller than the number of the plurality of instructions so as to implement the difference in terms of the managed device information.

6. A control method for a management apparatus connected to a managed device through a network and managing the managed device, the control method comprising:
   acquiring an instruction addressed to the managed device, wherein the acquired instruction includes at least one of an instruction to add a new network device to be monitored and an instruction to delete a monitored network device;

determining whether there is already stored an instruction to change or delete information on the managed device related to a new instruction, in response to acquisition of the new instruction;

deleting the already stored instruction to change or delete the information based on a determination result, in response to acquisition of the new instruction;

storing the acquired new instruction after the deletion of the already stored instruction; and receiving a query from the managed device, using a secure communication path, through a firewall as to the presence/absence of the acquired instruction and, when an instruction stored without being deleted is present, replying with the acquired instruction in response to the query in the course of a session established when the query is received, wherein the query is a request command for periodically requesting the stored instruction and includes type and version information of the managed device.

7. The control method according to claim 6, wherein the query as to the presence/absence of instructions is requested by the managed device and in response to the query by the managed device as to the presence/absence of instructions in response to the request, another acquired instruction is subsequently executed.

8. The control method according to claim 6, wherein replying to the acquired instructions includes:

counting the number of instructions returned in response to the query; and issuing a reply with a single instruction in response to the query and a request for the query as to the presence/absence of the instruction until the count reaches the number of stored instructions.

9. The control method according to claim 6, further comprising, along with implementing a plurality of acquired instructions, changing the plurality of instructions to instructions whose number is smaller than the number of the plurality of instructions, wherein the changed instructions are returned with the reply.

10. The control method according to claim 9, wherein changing the instructions includes:

recognizing a difference between information of the managed device changed based on the plurality of instructions and information of the managed device held prior to the plurality of instructions; and generating instructions whose number is smaller than the number of the plurality of instructions so as to implement the difference in terms of the managed device information.

11. A non-transitory computer readable medium containing computer-executable instructions for controlling a management apparatus connected to a managed device through a network and managing the managed device, the computer readable medium comprising:

computer readable instructions for acquiring an instruction addressed to the managed device, wherein the acquired instruction includes at least one of an instruction to add a new network device to be monitored and an instruction to delete a monitored network device;

computer readable instructions for determining whether there is already stored an instruction to change or delete information on the managed device related to a new instruction, in response to acquisition of the new instruction;

computer readable instructions for deleting the already stored instruction to change or delete the information based on a determination result, in response to acquisition of the new instruction;

computer readable instructions for storing the acquired instruction after the deletion of the already stored instruction; and computer readable instructions for receiving a query from the managed device, using a secure communication path, through a firewall as to the presence/absence of the acquired instruction and, when an instruction stored without being deleted is present, replying with the acquired instruction in response to the query in the course of a session established when the query is received, wherein the query is a request command for periodically requesting the stored instruction and includes type and version information of the managed device.

12. The management apparatus according to claim 1, further comprising a management unit configured to manage a user and identification information of a managed device in which the user has a right to issue commands, wherein the instruction storage unit is configured to, when identification information of a managed device which is a target of the instruction entered through the input unit is managed by the management unit, store the instruction entered through the input unit.

13. The management apparatus according to claim 1, wherein the instruction reply unit, along with replying with one instruction entered in response to the query, maintains the session and executes another entered instruction according to the response of the managed device to the reply.

14. The management apparatus according to claim 1, wherein the managed device is a monitoring device for monitoring a network device located in the network environment utilizing the firewall.

15. The management apparatus according to claim 1, wherein the query includes identification information of the managed device.

* * * * *